US011834149B2

(12) United States Patent
Baxter et al.

(10) Patent No.: US 11,834,149 B2
(45) Date of Patent: Dec. 5, 2023

(54) AIRCRAFT WITH ARTICULATABLE TAIL SECTION

(71) Applicant: Baxter Aerospace LLC., Tigard, OR (US)

(72) Inventors: Jeffrey Baxter, Tigard, OR (US); Michael Baxter, White Salmon, WA (US)

(73) Assignee: Baxter Aerospace LLC, Tigard, OR (US)

( * ) Notice: Subject to any disclaimer, the term of this patent is extended or adjusted under 35 U.S.C. 154(b) by 0 days.

(21) Appl. No.: 17/727,508

(22) Filed: Apr. 22, 2022

(65) Prior Publication Data

US 2023/0339596 A1   Oct. 26, 2023

(51) Int. Cl.
*B64C 1/26* (2006.01)
*B64C 29/00* (2006.01)
(Continued)

(52) U.S. Cl.
CPC ............ *B64C 1/26* (2013.01); *B64C 5/06* (2013.01); *B64C 13/28* (2013.01);
(Continued)

(58) Field of Classification Search
CPC ........ B64C 15/12; B64C 27/52; B64C 29/02; B64C 2201/088; B64U 10/20; B64U 30/297; B64U 50/18
See application file for complete search history.

(56) References Cited

U.S. PATENT DOCUMENTS 3,966,142 A * 6/1976 Corbett ................ B64C 1/30
                                              244/12.4
4,085,911 A * 4/1978 Nahodyl ........... B64C 29/0075
                                              244/12.4
(Continued)

FOREIGN PATENT DOCUMENTS

WO   WO2020/172689   8/2020

OTHER PUBLICATIONS

United States Marine Corps, HQMC, "Osprey Deemed Ready for Deployment", www.navair.navy.mil, Jun. 14, 2007, accessed on Jul. 6, 2023 at https://web.archive.org/web/20161201231225/http://www.navair.navy.mil/v22/index.cfm?fuseaction=news.detail&id=178, 1 page.
(Continued)

*Primary Examiner* — Tien Q Dinh
*Assistant Examiner* — Katherine June Bolek
(74) *Attorney, Agent, or Firm* — Brownstein Hyatt Farber Schreck, LLP

(57) ABSTRACT

An aircraft may include a body structure, a tail section articulatably coupled to the body structure and including a tail structure, a propulsion system coupled to the tail structure and configured to produce thrust for the aircraft, and a stabilizer coupled to the tail structure, and an actuation system configured to articulate the tail section relative to the body structure to change a thrust vector of the propulsion system and an angle of attack of the stabilizer during flight. The actuation system may be configured to articulate the tail section about at least two perpendicular rotational axes. The propulsion system may be configured to produce the thrust in a first thrust direction in a first flight mode (e.g., a rotor-borne flight mode) and to produce the thrust in a second thrust direction in a second flight mode (e.g., a wing-borne flight mode).

21 Claims, 28 Drawing Sheets

(51) Int. Cl.
*B64C 5/06* (2006.01)
*B64C 13/28* (2006.01)
*B64C 29/02* (2006.01)
*B64C 15/12* (2006.01)

(52) U.S. Cl.
CPC .......... *B64C 29/0008* (2013.01); *B64C 29/02* (2013.01); *B64C 15/12* (2013.01)

(56) References Cited

U.S. PATENT DOCUMENTS

| | | | | |
|---|---|---|---|---|
| 7,195,207 | B2* | 3/2007 | Rutan | B64G 1/14 244/159.1 |
| 7,766,275 | B2* | 8/2010 | Hawley | B64D 27/26 244/36 |
| 8,505,846 | B1* | 8/2013 | Sanders | B64C 11/003 244/7 B |
| 10,054,939 | B1* | 8/2018 | Applewhite | B64F 1/06 |
| 10,946,956 | B2* | 3/2021 | Campbell | B64C 27/50 |
| 11,524,766 | B2* | 12/2022 | Campbell | G05D 1/101 |
| 2019/0061936 | A1* | 2/2019 | North | B64C 11/46 |
| 2022/0388650 | A1* | 12/2022 | Mills | B64U 10/20 |

OTHER PUBLICATIONS

Syma, "S107H 3CH 2.4GHZ Hover Function Remote Control Helicopter Manual", S107H Phantom Helicopter, Syma Official Site, www.symatoys.com, 2018, accessed on Jul. 6, 2023 at https://web.archive.org/web/20181105172219/https://www.symatoys.com/goodshow/s107h-syma-s107h-phantom.html, 15 pages.

BAE Systems, Hawker Siddeley Harrier, Company Profile, Heritage, Hawker Siddeley BAe Harrier, www.baesystems.com, 2017, accessed on Jul. 6, 2023 at https://web.archive.org/web/20170701213314/https:/www.baesystems.com/en/heritage/hawker-siddeley-harrier, 27 pages.

Aerovel Corporation, "Flexrotor Unmanned Aerial System—Overview", aerovel.com, 2017, accessed on Jul. 6, 2023 at https://web.archive.org/web/20170912014648/https://aerovel.com/flexrotor/, 3 pages.

* cited by examiner

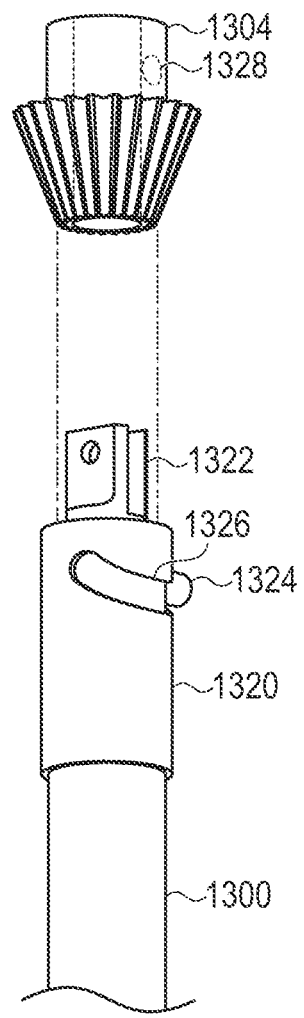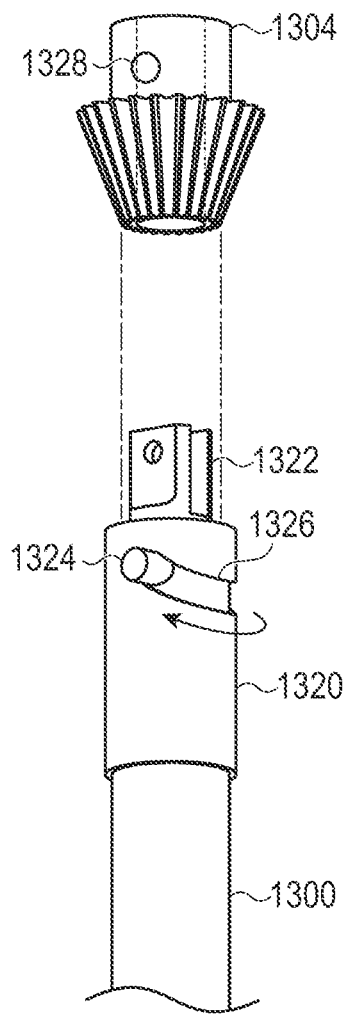
*FIG. 13C*  *FIG. 13D*

AIRCRAFT WITH ARTICULATABLE TAIL SECTION

FIELD

The subject matter of this disclosure relates generally to aircraft, and more particularly to aircraft with an articulatable tail section for controlling attitude and/or direction of flight of an aircraft.

BACKGROUND

Unmanned aircraft, sometimes referred to as drones, are increasingly employed for recreation, air-to-ground photography, package delivery, and other tasks. Unmanned aircraft may use various types of propulsion and lift-generating systems, such as rotors, propellers, fixed wings, and combinations thereof. The particular combination of propulsion and lift-generating systems used on an aircraft may dictate how the aircraft is operated or flown. For example, rotor-based aircraft may have vertical take-off and landing ("VTOL") capabilities, while fixed-wing aircraft may employ traditional rolling take-off and landing operations. Combining fixed-wing structures with rotor-based propulsion systems may provide a wide range of potential flight operations.

SUMMARY

An aircraft may include a body structure, a tail section articulatably coupled to the body structure and including a tail structure, a propulsion system coupled to the tail structure and configured to produce thrust for the aircraft, and a stabilizer coupled to the tail structure, and an actuation system configured to articulate the tail section relative to the body structure to change a thrust vector of the propulsion system and an angle of attack of the stabilizer during flight. The actuation system may be configured to articulate the tail section about at least two perpendicular rotational axes. The propulsion system may be configured to produce the thrust in a first thrust direction in a first flight mode and to produce the thrust in a second thrust direction in a second flight mode. The first flight mode may be a rotor-borne flight mode and the first thrust direction may be in an aft direction along a longitudinal axis of the body structure, and the second flight mode may be a wing-borne flight mode and the second thrust direction may be in a forward direction along the longitudinal axis of the body structure. The first flight mode may correspond to a vertical take-off operation in which the longitudinal axis of the body structure is substantially perpendicular to a ground reference.

The propulsion system may include a rotor. The rotor may be a first rotor configured to rotate in a first rotational direction, and the propulsion system may further include a second rotor configured to rotate in a second rotational direction opposite the first rotational direction.

An aircraft may include a fuselage, a pair of wings extending from the fuselage and configured to produce lift in a wing-borne flight mode of the aircraft, a tail section coupled to the fuselage and including a propulsion system configured to produce thrust for the aircraft and a stabilizer, and a gimballing mechanism coupling the tail section to the fuselage and configured to rotate the tail section, relative to the fuselage, about at least two rotational axes.

The at least two rotational axes may include a first axis of rotation and a second axis of rotation perpendicular to the first axis of rotation. Rotation of the tail section about the first axis of rotation during wing-borne flight may change a pitch of the aircraft, and rotation of the tail section about the second axis of rotation during wing-borne flight may change a yaw of the aircraft.

The propulsion system may be configured to produce lift in a rotor-borne flight mode of the aircraft. The gimballing mechanism may be configured to change a vector of the thrust during the rotor-borne flight mode of the aircraft to control at least one of an attitude of the aircraft or a direction of flight of the aircraft. The rotor-borne flight mode may correspond to at least one of a vertical take-off operation or a vertical landing operation. The gimballing mechanism may be configured to change an angle of attack of the stabilizer during the wing-borne flight mode to control at least one of an attitude of the aircraft or a direction of flight of the aircraft. The stabilizer may be a first stabilizer and the tail section may further include at least one second stabilizer.

An aircraft configured for vertical take-off and vertical landing operations may include a fuselage, a pair of wings extending from the fuselage, and a tail section articulatably coupled to the fuselage and including a propulsion system configured to produce thrust for the aircraft and a stabilizer. The aircraft may be configured to articulate the tail section relative to the fuselage during a vertical take-off operation to change a vector of the thrust produced by the propulsion system, thereby changing at least one of an attitude or a direction of flight of the aircraft and articulate the tail section relative to the fuselage during a wing-borne flight mode of the aircraft to change an angle of attack of the stabilizer.

The propulsion system may be configured to produce lift for the aircraft during the vertical take-off operation. The propulsion system may be configured to produce thrust in a first direction during the vertical take-off operation, and produce thrust in a second direction during the wing-borne flight mode, the second direction substantially opposite the first direction. A longitudinal axis of the fuselage may be substantially perpendicular to a ground reference during the vertical take-off operation and substantially parallel to the ground reference during the wing-borne flight mode. The aircraft may be oriented in a nose-down configuration during the vertical take-off operation.

A method of controlling an aircraft in multiple modes of flight may include, at an aircraft including a body structure, a pair of wings extending from the body structure, and a tail section including a propulsion system and a set of stabilizers, during a rotor-borne flight mode, controlling movement of the aircraft about a pitch axis and a yaw axis by articulating the tail section relative to the body structure, and during a wing-borne flight mode, controlling movement of the aircraft about the pitch axis and the yaw axis by articulating the tail section relative to the body structure.

Articulating the tail section relative to the body structure during the rotor-borne flight mode may change a direction of a thrust vector from the propulsion system, and the movement of the aircraft about the pitch axis and the yaw axis during the rotor-borne flight may be produced at least in part by the changes in direction of the thrust vector. Articulating the tail section relative to the body structure during the wing-borne flight mode may change an angle of attack of at least one stabilizer of the set of stabilizers, and the movement of the aircraft about at least one of the pitch axis or the yaw axis during the wing-borne flight may be produced at least in part by the changes in angle of attack of the at least one stabilizer.

The aircraft may further include a closed-loop pitch controller configured to control a pitch of the aircraft using a first set of tuning parameters during the rotor-borne flight mode and using a second set of tuning parameters during the wing-borne flight mode, and a closed-loop yaw controller configured to control a yaw of the aircraft using a third set of tuning parameters during the rotor-borne flight mode and using a fourth set of tuning parameters during the wing-borne flight mode.

An aircraft may include a fuselage, a propulsion assembly configured to produce thrust for the aircraft, and a gimballing mechanism articulatably coupling the propulsion assembly to the fuselage and configured to rotate the propulsion assembly about a first axis of rotation defined through a center of mass of the propulsion assembly, and rotate the propulsion assembly about a second axis of rotation defined through the center of mass of the propulsion assembly. The first axis of rotation may be perpendicular to the second axis of rotation. The first axis of rotation may be perpendicular to the second axis of rotation.

The propulsion assembly may include a rotor configured to produce the thrust for the aircraft, and at least one stabilizer. Rotation of the propulsion assembly about the first axis of rotation may be configured to control a yaw of the aircraft in both a wing-borne flight mode and a rotor-borne flight mode, and rotation of the propulsion assembly about the second axis of rotation may be configured to control a pitch of the aircraft in both the wing-borne flight mode and the rotor-borne flight mode.

The gimballing mechanism may include a first four-bar mechanism configured to guide the propulsion assembly about the first axis of rotation, and a second four-bar mechanism nested with the first four-bar mechanism and configured to guide the propulsion assembly about the second axis of rotation. The gimballing mechanism may include a first crank-slider mechanism configured to guide the propulsion assembly about the first axis of rotation, and a second crank-slider mechanism nested with the first crank-slider mechanism and configured to guide the propulsion assembly about the second axis of rotation.

An aircraft may include a body structure, a propulsion assembly configured to produce thrust for the aircraft, and a gimballing mechanism articulatably coupling the propulsion assembly to the aircraft and including a first four-bar mechanism actuatable to rotate the propulsion assembly about a first axis of rotation and a second four-bar mechanism actuatable to rotate the propulsion assembly about a second axis of rotation different from the first axis of rotation.

The first four-bar mechanism may include a base structure, a frame structure, and a set of links pivotally coupled to the base structure and to the frame structure to couple the base structure to the frame structure and define an articulation path of the frame structure relative to the base structure. The frame structure may be a first frame structure, the set of links may be a first set of links, and the second four-bar mechanism may include the first frame structure, a second frame structure, and a second set of links pivotally coupled to the first frame structure and to the second frame structure to couple the first frame structure to the second frame structure and define an articulation path of the second frame structure relative to the first frame structure.

The propulsion assembly may be coupled to the second frame structure. The gimballing mechanism may further include a first actuator configured to impart a first force on the first frame structure to rotate the propulsion assembly about the first axis of rotation, and a second actuator configured to impart a second force on the second frame structure to rotate the propulsion assembly about the second axis of rotation. The first set of links may include a first actuation link, the first actuator may be coupled to the first actuation link and imparts the first force to the first frame structure via the first actuation link, the second set of links may include a second actuation link, and the second actuator may be coupled to the second actuation link and imparts the second force to the second frame structure via the second actuation link. The propulsion assembly may further include at least one stabilizer.

The first axis of rotation may extend through a center of mass of the propulsion assembly, and the second axis of rotation may extend through the center of mass of the propulsion assembly and is perpendicular to the first axis of rotation. Rotation of the propulsion assembly about the first axis of rotation may be configured to control a pitch of the aircraft, and rotation of the propulsion assembly about the second axis of rotation may be configured to control a yaw of the aircraft.

An aircraft may include a body structure and a propulsion system coupled to the body structure and including a mounting shaft and a rotor coupled to the mounting shaft. The rotor may include a rotor hub and a set of rotor blades extending from the rotor hub, wherein the rotor is configured to orient the set of rotor blades at a first collective blade angle during a first flight mode and orient the set of rotor blades at a second collective blade angle during a second flight mode. The propulsion system may further include a motor coupled to the rotor and configured to rotate the rotor in a first rotational direction in the first flight mode to produce thrust in a first thrust direction and rotate the rotor in a second rotational direction opposite the first rotational direction in the second flight mode to produce thrust in a second thrust direction opposite the first thrust direction.

The rotor may be a first rotor, the rotor hub may be a first rotor hub, the set of rotor blades may be a set of first rotor blades, the motor may be a first motor, and the aircraft may further include a second rotor coupled to the mounting shaft and including a second rotor hub and a set of second rotor blades extending from the second rotor hub, wherein the second rotor is configured to orient the set of second rotor blades at a third collective blade angle during the first flight mode and orient the set of second rotor blades at a fourth collective blade angle during a second flight mode. The aircraft may further include a second motor coupled to the second rotor and configured to rotate the second rotor in the second rotational direction in the first flight mode to produce thrust in the first thrust direction and rotate the rotor in the first rotational direction in the second flight mode to produce thrust in the second thrust direction.

The rotor may include a locking mechanism configured to lock the set of rotor blades at the first collective blade angle during the first flight mode and lock the set of rotor blades at the second collective blade angle during the second flight mode. The locking mechanism may include, for a rotor blade of the set of rotor blades, a locking wheel coupled to the rotor blade, and the rotor hub may define a first rotation-limiting feature configured to engage the locking wheel to orient the rotor blade at the first collective blade angle and a second rotation-limiting feature configured to engage the locking wheel to orient the rotor blade at the second collective blade angle.

The locking mechanism may include, for a rotor blade of the set of rotor blades, a centrifugal locking mechanism configured to lock the rotor blade at the first collective blade angle when the rotor is rotating above a first threshold speed in the first rotational direction, unlock the rotor blade when the rotor is below the first threshold speed in the first rotational direction, and lock the rotor blade at the second collective blade angle when the rotor is rotating above a second threshold speed in the second rotational direction. When the rotor blade is unlocked, the rotor blade may be movable from the first collective blade angle to the second collective blade angle.

The locking mechanism may be further configured to unlock the set of rotor blades during a transition from the first flight mode to the second flight mode to allow the rotor blades of the set of rotor blades to move from the first collective blade angle to the second collective blade angle. The rotor blades may be unlocked when the rotor is transitioning from rotating in the first rotational direction to rotating in the second rotational direction.

An aircraft may include a body structure and a propulsion system coupled to the body structure. The propulsion system may include a mounting shaft and a rotor coupled to the mounting shaft and including a rotor hub and a set of rotor blades extending from the rotor hub. The propulsion system may further include a motor coupled to the rotor and configured to, in a first flight mode, rotate the rotor in a first rotational direction, in a second flight mode, rotate the rotor in a second rotational direction opposite the first rotational direction, and in a transition between the first flight mode and the second flight mode, change a collective blade angle of the set of rotor blades.

The rotor may include a first rotor blade, a first rotor gear coupled to the first rotor blade, a second rotor blade, and a second rotor gear coupled to the second rotor blade. The aircraft may further include a drive gear coupled to the motor and engaged with the first and second rotor gears. The rotor may include a locking mechanism configured to lock the set of rotor blades at a first collective blade angle during the first flight mode, lock the set of rotor blades at a second collective blade angle during the second flight mode, and unlock the set of rotor blades during a transition between the first flight mode and the second flight mode such that the rotor blades of the set of rotor blades are movable from the first collective blade angle to the second collective blade angle. When the set of rotor blades is locked at the first collective blade angle, rotation of the drive gear in the first rotational direction may cause the rotor to rotate in the first rotational direction, when the set of rotor blades is locked at the second collective blade angle, rotation of the drive gear in the second rotational direction may the rotor to rotate in the second rotational direction, when the set of rotor blades is unlocked, rotation of the drive gear may cause the set of rotor blades to transition between the first and second collective blade angles.

The first rotor gear and the second rotor gear may be fixed relative to the rotor hub when the set of rotor blades are locked at a first collective blade angle and when the set of rotor blades are locked at a second collective blade angle, and the first rotor gear and the second rotor gear may be rotatable relative to the rotor hub when the set of rotor blades are unlocked. The locking mechanism may include, for a rotor blade of the set of rotor blades, a locking wheel coupled to the rotor blade. The rotor hub may define a first locking feature configured to engage the locking wheel to lock the rotor blade at the first collective blade angle and a second locking feature configured to engage the locking wheel to lock the rotor blade at the second collective blade angle. The locking wheel may define a locking tab, the first locking feature may include a recess configured to receive the locking tab at least partially therein to lock the rotor at the first collective blade angle, and the second locking feature may include a recess configured to receive the locking tab at least partially therein to lock the rotor at the second collective blade angle.

An aircraft may include a body structure and a propulsion system coupled to the body structure and including a mounting shaft and a rotor coupled to the mounting shaft. The rotor may include a rotor hub and a set of rotor blades extending from the rotor hub and orientable in a first locked orientation relative to the rotor hub and corresponding to a first collective blade angle and a second locked orientation relative to the rotor hub and corresponding to a second collective blade angle. The propulsion system may further include a motor coupled to the rotor and configured to rotate the rotor in a first rotational direction when the set of rotor blades is in the first locked orientation to produce thrust in a forward direction and rotate the rotor in a second rotational direction opposite the first rotational direction when the set of rotor blades is in the second locked orientation to produce thrust in a rearward direction.

The rotor may further include a locking mechanism configured to lock the set of rotor blades in the first locked orientation when the rotor is rotating above a threshold speed in the first rotational direction. The locking mechanism may include a locking wheel coupled to a rotor blade of the set of rotor blades and defining a first locking feature, the rotor blade may be configured to translate radially outward relative to the rotor hub when the rotor is rotating above the threshold speed in the first rotational direction, and the radial translation of the rotor blade engages the first locking feature with a second locking feature on the rotor hub. The first locking feature may be a protrusion extending from the locking wheel, and the second locking feature may be a recess defined by the rotor hub. The aircraft may further include a biasing mechanism configured to impart a biasing force on the rotor blade, the biasing force acting radially inward relative to the rotor hub. A centrifugal force acting on the rotor blade may overcome the biasing force when the rotor is rotating above the threshold speed in the first rotational direction.

A method of controlling an aircraft may include, at an aircraft comprising a fuselage, a pair of wings extending from the fuselage, and a propulsion assembly configured to produce thrust for the aircraft, rotating the propulsion assembly about a first axis of rotation defined through a center of mass of the propulsion assembly to control a yaw of the aircraft, and rotating the propulsion assembly about a second axis of rotation defined through the center of mass of the propulsion assembly to control a pitch of the aircraft. Rotation of the propulsion assembly about the first axis of rotation may be configured to control the yaw of the aircraft in both a wing-borne flight mode and a rotor-borne flight mode, and rotation of the propulsion assembly about the second axis of rotation may be configured to control the pitch of the aircraft in both the wing-borne flight mode and the rotor-borne flight mode. Rotation of the propulsion assembly about the first axis of rotation during a rotor-borne flight mode may change a direction of a thrust vector from a propulsion system of the propulsion assembly. The propulsion assembly may include at least one stabilizer, and rotating the propulsion assembly about the first axis of rotation during a wing-borne flight mode may change an angle of attack of the at least one stabilizer.

BRIEF DESCRIPTION OF THE DRAWINGS

The disclosure will be readily understood by the following detailed description in conjunction with the accompanying drawings, wherein like reference numerals designate like structural elements, and in which:

FIGS. 13A-13D illustrate another example rotor with a variable collective blade angle.

DETAILED DESCRIPTION

Figure 1:
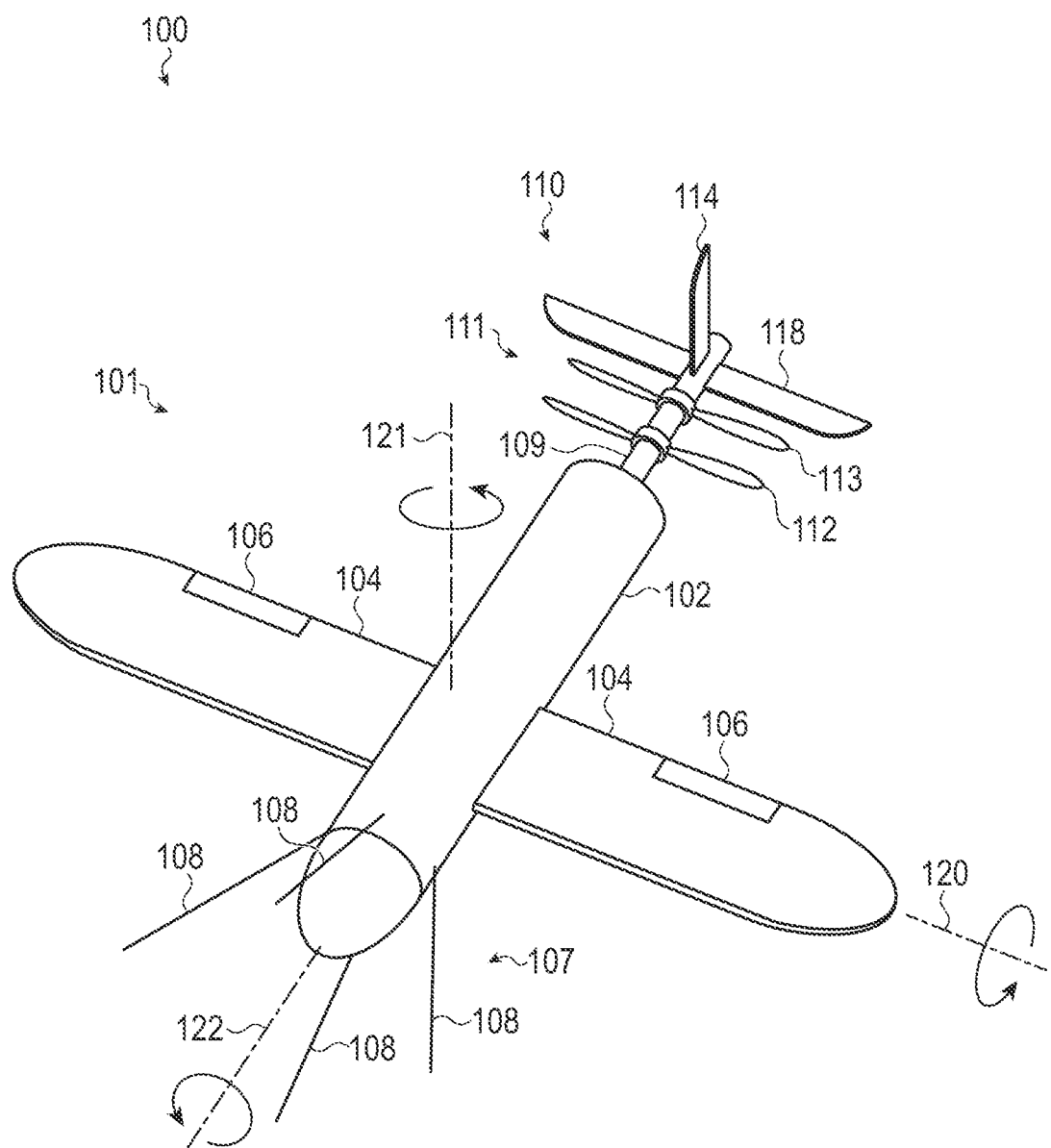
FIG. 1 illustrates an example aircraft having an articulatable tail section.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Unmanned aircraft are increasingly being deployed for myriad airborne-based tasks, such as package delivery, aerial photography, communications, and the like. Aircraft that rely on rotor-borne flight modes provide various advantages, such as VTOL and hover capabilities, but may be less efficient than fixed-wing aircraft. On the other hand, while fixed-wing aircraft may be more energy efficient and provide comparatively longer flight times and/or range than rotor-based aircraft, they generally require more space for horizontal or rolling take-off and landing operations, reducing their deployment potential. Described herein are aircraft that are capable of both wing-borne flight and rotor-borne flight. For example, an aircraft may include fixed wings that provide lift for wing-borne flight, as well as a rotor system that can provide thrust and lift for VTOL and hover operations, and can provide thrust for wing-borne flight. Moreover, aircraft as described herein employ a single actuation system that provides both pitch and yaw control during both rotor-borne and wing-borne flight operations, thereby simplifying the overall construction and control of the aircraft and enabling unique flight operations and maneuvers.

In particular, the instant application describes an aircraft that uses an articulatable tail section that includes both a propulsion system (such as a rotor) and stabilizers to provide pitch and/or yaw control of the aircraft during wing-borne and rotor-borne flight modes. Because the tail section is articulatable relative to the fuselage, movement of the tail section can be used to both change the direction of the thrust from the rotor (a technique that may be referred to as thrust vectoring) and to change the aerodynamic effect of the stabilizers during flight. For example, an aircraft employing the articulatable tail section may be configured for VTOL operations in which the aircraft takes off from a vertical configuration, either in a nose-down (e.g., "nose-sitter") or tail-down (e.g., "tail-sitter") orientation. During a vertical take-off operation, the rotor provides thrust in the vertical direction, thereby lifting the aircraft off the ground. During this operation (or a hovering or other vertical flight operation), the tail section may be articulated to provide thrust vectoring to control the attitude and/or direction of the aircraft. In this way, both the pitch and the yaw of the aircraft during rotor-borne flight may be controlled by articulating the tail section relative to the fuselage.

Once the aircraft transitions from a rotor-borne flight mode to a wing-borne flight mode, the tail section may be articulated to change the aerodynamic effect of the stabilizers. More particularly, articulating the tail section relative to the fuselage can change the angle of attack of the stabilizers, which ultimately affects the pitch and/or yaw of the aircraft during wing-borne flight (similar to the operation of a rudder and/or elevator).

By combining both the rotor and the stabilizers on the articulatable tail section, a single actuation system can be used to provide pitch and yaw control in rotor-borne flight (primarily via thrust vectoring) and in wing-borne flight (primarily via the aerodynamic effect of the stabilizers). Further, combining the components for these two flight control paradigms on a structure that uses a single actuation system simplifies the design, construction, and maintenance of the aircraft. For example, because pitch and yaw can be controlled in wing-borne flight by articulating the entire tail section, the aircraft can be designed without a separate set of movable flight control surfaces for pitch and yaw (e.g., without separately movable elevators, rudders, ruddervators, etc.), and without separate control systems for controlling those flight control surfaces.

Using the same actuation system for both rotor- and wing-borne flight modes also simplifies the transition from one flight mode to the other. For example, as the flight paradigm changes from rotor-borne to wing-borne flight, the aircraft need not transition to operating a different set of flight control surfaces and associated control schemes for pitch and yaw control. Instead, the aircraft can continue using the same actuation system and control scheme (optionally with different tuning parameters) that were utilized during rotor-borne flight.

Actuation of the tail section may be accomplished using various types of mechanical and/or electromechanical systems. For example, the actuation system may include a gimballing mechanism that allows the tail section to rotate about two perpendicular axes of rotation. The gimballing mechanism may include a nested four-bar mechanism that enables two-axis motion control of the tail section and also defines the motion parameters of the tail section.

The actuation system for the tail section may also be configured so that the movement of the tail section is primarily characterized by rotations about a center of mass (or center of minimum rotational resistance) of the tail section. Because the moment of inertia of the tail section is lowest about its center of mass, configuring the actuation system to rotate the tail section about the center of mass may reduce the force and overall energy required to move the tail section. Accordingly, smaller, lighter actuators may be used to produce the desired motion.

As described herein, an aircraft's pitch and yaw may be controlled by articulating a tail section relative to a fuselage. In some cases, roll control may also be provided by the tail section. For example, the propulsion system may include two (or more) counter-rotating rotors positioned on the tail section. By adjusting the relative speeds of the two rotors, a differential torque may be produced on the aircraft. The differential torque results in a rolling moment being imparted to the aircraft, ultimately causing a roll motion. Examples of rotors that may be used in a counter-rotating configuration to produce relative torque on the aircraft to produce roll moments are described herein with respect to FIGS. 9-14. In some cases, wing-mounted ailerons (or other flight control surfaces) are used instead of or in addition to counter-rotating rotors of a propulsion system to control the roll of the aircraft.

Figure 4:
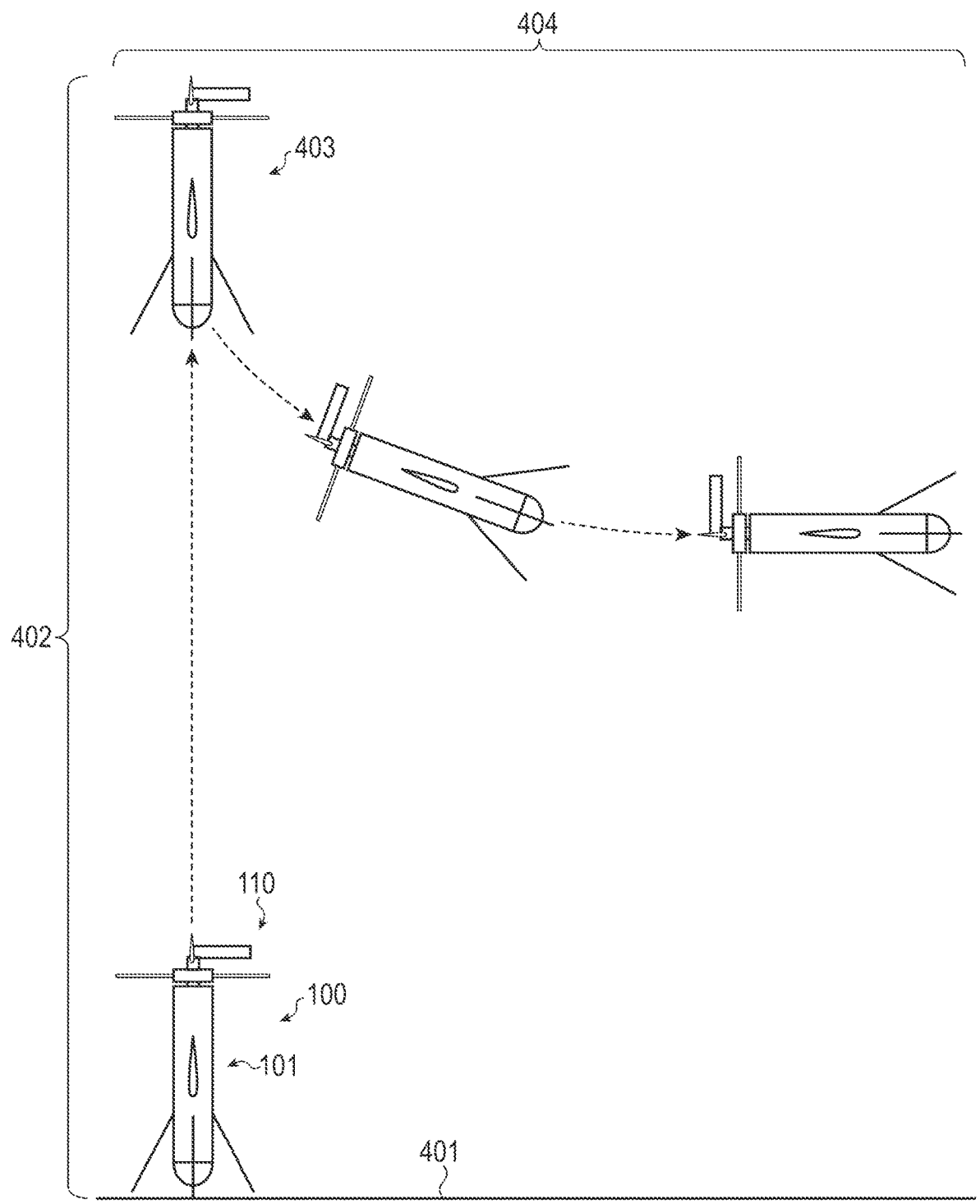
FIG. 4 illustrates an example take-off operation of the aircraft of FIG. 1.

As described herein, an aircraft may be configured for both VTOL operations, such as a vertical take-off operation in which the nose of the aircraft is facing down, and horizontal, wing-borne flight modes. These operations may require thrust in opposite directions. For example, a nose-down take-off operation may require aft-directed thrust, while horizontal wing-borne flight may require forward-directed thrust (as shown in FIG. 4, below). Accordingly, an aircraft according to the present disclosure may include a propulsion system capable of producing thrust in both directions. In particular, an aircraft may include a rotor system in which the rotational direction of the rotors may be changed in order to change the thrust direction. Because rotor blades may be optimized for rotation in one direction (resulting in asymmetrically shaped rotor blades), simply switching the rotation direction of the rotor may not result in equal thrust capabilities in both directions, resulting in sub-optimal efficiency during some flight operations. Accordingly, the aircraft described herein may have rotor blades with variable blade angles, such that the blade angles can be changed (e.g., rotated 180 degrees about an axis) in conjunction with the change in rotational direction of the rotor. In some cases, the rotor mechanism may be configured such that reversing the rotation direction of the rotor also results in the reversal of the rotor blade angles.

FIG. 1 depicts an example aircraft 100. The aircraft 100 includes a body structure 101 and a tail section 110 articulatably coupled to the body structure 101. The body structure 101 includes a fuselage 102 and a pair of wings 104 extending from the fuselage 102. The wings 104 may include flight control surfaces for controlling the attitude and/or direction of flight of the aircraft 100, such as ailerons 106. The aircraft 100 may define a pitch axis 120, yaw axis 121, and roll axis 122. The pitch, roll, and yaw axes shown in FIG. 1 are illustrative, and need not be in the exact locations on the fuselage as shown in FIG. 1 in a given implementation.

As shown in FIG. 1, the body structure includes a fuselage 102 and a pair of wings 104 extending from the fuselage 102. However, this is merely one example of a body structure for an aircraft that uses the mechanisms and techniques described herein. For example, the body structure of the aircraft 100 may resemble a flying wing with no distinct structural boundary between a fuselage portion and a wing portion. As another example, the body structure of the aircraft 100 may be a lifting-body design that does not include distinct airfoil-shaped wings. While the present discussion uses an aircraft with a fuselage and fixed wing structure as an example, the principles can apply equally to other types of body structures. Examples of body structures that may use the techniques and mechanisms described herein include, without limitation, lifting body aircraft, flying wing aircraft, multi-fuselage aircraft, twin boom aircraft, blended wing body aircraft, and delta wing aircraft.

The body structure 101 may include a ground support system 107 for supporting the aircraft 100 on the ground in a vertical orientation. For example, the ground support system 107 positions the aircraft 100 in a "nose-sitter" configuration for take-off and landing operations. The ground support system 107 may include legs 108 extending in a generally forward direction from the fuselage 102. The legs 108 may be retractable, foldable, or otherwise articulatable, such that they can be stowed during flight or otherwise moved between a deployed position and an undeployed position (which may be more aerodynamically efficient during flight). While FIG. 1 shows the ground support system 107 extending from the front of the aircraft 100, the ground support system 107 may in some examples extend from the rear of the aircraft 100, such that the aircraft 100 can operate as a "tail-sitter." In some cases, the aircraft 100 may have multiple ground support systems (e.g., forward-extending and rearward-extending), facilitating both tail-sitting and nose-sitting configurations. Further, the aircraft 100 may include landing gear and/or other ground support systems to facilitate rolling take-off and landing operations.

The tail section 110 of the aircraft 100 includes a tail structure 109, a propulsion system 111 coupled to the tail structure 109 and configured to produce thrust for the aircraft 100, and one or more stabilizers 114, 118. The propulsion system 111 may include one or more rotors that provide thrust for both wing-borne and rotor-borne flight. As shown, the propulsion system 111 includes two rotors 112, 113, which may be configured to rotate in opposite directions from one another while both producing thrust in the same direction. In some examples, the propulsion system 111 may include only one rotor, or more than two rotors. The rotor(s) may be driven by electric motors, internal combustion motors, or the like. In some cases, the propulsion system 111 includes or uses other systems to provide thrust, such as turbines, solid- and/or liquid-fuel rocket motors, or the like. Further, in some cases, one or more components of the propulsion system 111 are located on the body structure 101 of the aircraft 100. For example, tail-mounted rotors may be driven by a motor that is mounted on the body structure 101. In such cases, an articulatable drive shaft may extend from the motor to the rotor(s) or other tail-mounted propulsion components.

The tail section 110 may also include stabilizers, such as stabilizers 114, 118. In the example of FIG. 1, the aircraft 100 includes a horizontal stabilizer 118 and a vertical stabilizer 114, though this is merely one example configuration. In other examples, more or fewer stabilizers may be used. For example, the aircraft 100 may include stabilizers arranged in a v-tail arrangement, a cruciform arrangement, a star or radial arrangement, or the like. The stabilizers 114, 118 may lack separately movable flight control surfaces such as rudders, elevators, and the like, to control the attitude and/or direction of flight of the aircraft 100. Instead, as described herein, the entire tail section 110 may be articulated relative to the fuselage 102 to change an angle of attack of the stabilizers 114, 118 during flight, thereby imparting pitching or yawing moments on the aircraft 100.

FIGS. 2A-3D depict example articulations of the tail section 110 of the aircraft 100, illustrating how the articulations can be used to control the attitude (e.g., pitch and yaw) and/or direction of flight of the aircraft 100 during multiple modes of flight. For simplicity, the aircraft 100 is shown as having only one rotor, though it will be understood that the aircraft 100 may include more rotors (e.g., two counter-rotating rotors, as shown in the example of FIG. 1), or a different propulsion system altogether.

As used herein, the attitude of the aircraft may refer to the attitude of an aircraft relative to the earth (e.g., a fixed frame of reference) or to the relative wind. Thus, for example, an aircraft executing a hover maneuver in a cross-wind may use an articulation of the tail section to change and/or control its attitude relative to the wind, despite the fact that the attitude of the aircraft relative to the ground may not change. Thus, it will be understood that changing and/or controlling the attitude of the aircraft includes attitude changes relative to the wind, even if those attitude changes do not result in an attitude change relative to the earth.

Figure 2A:
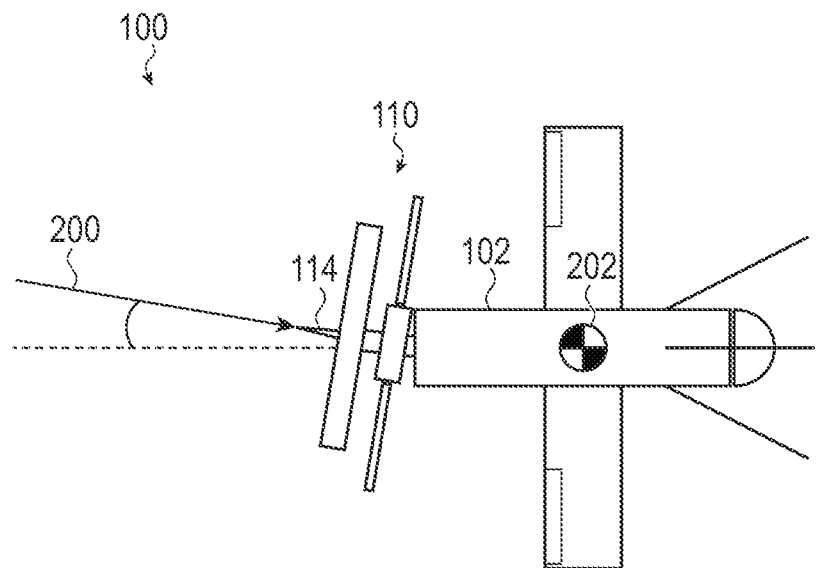
FIGS. 2A-2D illustrate the aircraft of FIG. 1 with a tail section articulated to control a yaw of the aircraft.
Figure 2B:
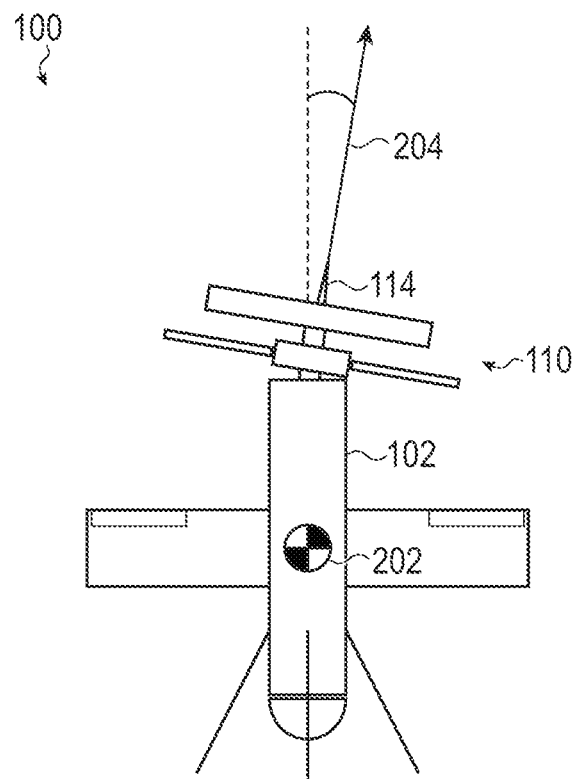
Figure 2C:
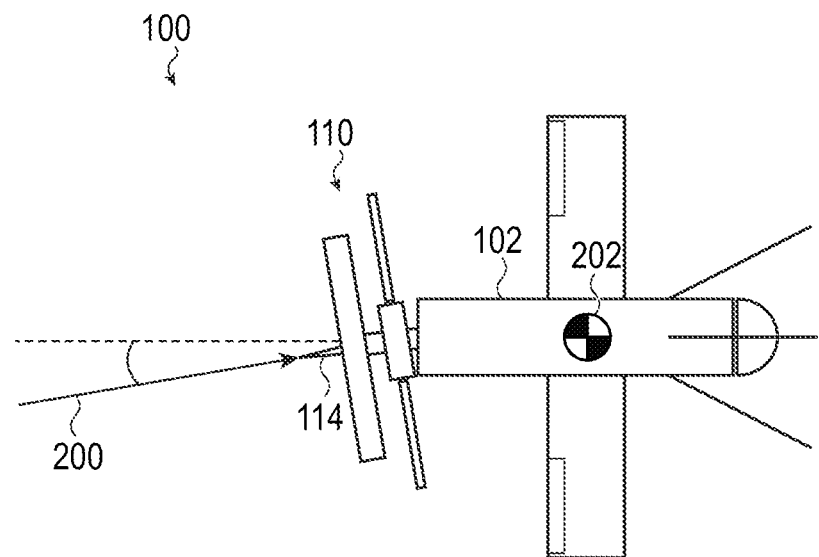

FIGS. 2A-2D illustrate the tail section 110 rotating about a first rotation axis. The first rotation axis may be substantially parallel to a yaw axis (e.g., the yaw axis 121 in FIG. 1) of the aircraft 100, or otherwise configured to impart a yaw moment on the aircraft 100. FIGS. 2A and 2C, which may represent the aircraft 100 while in wing-borne flight, illustrate how rotation of the tail section 110 about the first axis of rotation causes the angle of attack of the vertical stabilizer 114 to change in a manner that produces a yaw moment on the aircraft 100 (e.g., in a manner similar to that of a rudder). Additionally, the articulation of the tail section 110 changes the direction of the thrust vector 200 of the propulsion system such that the thrust vector is offset from (e.g., does not pass through and/or intersect) the center of mass 202 of the aircraft 100. This offset may produce a yaw moment in addition to the yaw moment from the aerodynamic effect of changing the angle of attack of the stabilizer 114. As shown in FIGS. 2A and 2C, the thrust vector 200 is acting in a forward direction (e.g., generally towards the nose of the aircraft 100).

Figure 2D:
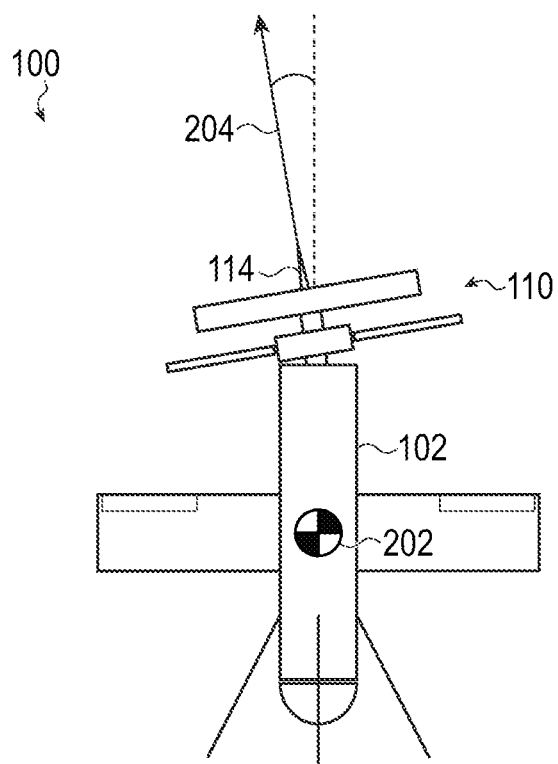

FIGS. 2B and 2D illustrate how the same type of articulation of the tail section 110 that is used to control the yaw of the aircraft 100 during wing-borne flight may be used to control the yaw of the aircraft 100 during rotor-borne flight, such as during take-off and landing operations, hover operations, or the like. During some phases of rotor-borne flight, the airspeed of the aircraft 100 may be less than during wing-borne flight. Thus, during rotor-borne flight, the angle of attack of the stabilizers may have relatively less (or negligible) effect on the attitude and/or direction of flight of the aircraft as compared to wing-borne flight. Accordingly, attitude/directional control from articulating the tail section 110 may be provided primarily by thrust vectoring, in which the thrust vector from the propulsion system primarily or substantially determines the attitude and/or flight direction of the aircraft 100.

For example, as shown in FIGS. 2B and 2D, which may represent the aircraft 100 during a vertical take-off operation in which the longitudinal axis of the aircraft 100 (which may generally correspond to the roll axis 123 of the aircraft 100) is substantially perpendicular to a ground reference, the rotation of the tail section 110 about the first axis of rotation causes the thrust vector 204 to be angled relative to the longitudinal or roll axis of the aircraft 100. This variation in thrust vector angle, which also corresponds to the thrust vector being offset from the center of mass 202 of the aircraft 100, may control the yaw of the aircraft 100 and/or change the direction of motion of the aircraft 100 during rotor-borne flight operations. As shown in FIGS. 2B and 2D, the thrust vector 204 is acting in an aft direction, resulting in the aircraft 100 lifting or hovering vertically relative to the ground in a nose-down orientation.

FIGS. 3A-3D illustrate how the tail section 110 may control a pitch of the aircraft 100 via rotation about a second axis of rotation that is perpendicular to the first axis of rotation. In particular, while FIGS. 2A-2D illustrate the tail section 110 rotating about a first axis of rotation that is substantially parallel to the yaw axis 121 of the aircraft 100, FIGS. 3A-3D illustrate the tail section rotating about a second axis of rotation that is substantially parallel to a pitch axis 120 (FIG. 1) of the aircraft 100, and thus perpendicular to the first axis of rotation of the tail section 110.

Figure 3A:
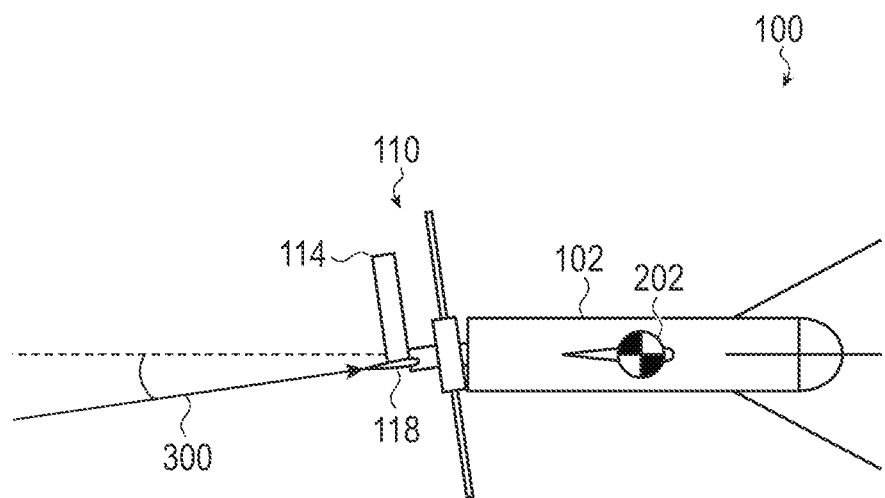
FIGS. 3A-3D illustrate the aircraft of FIG. 1 with a tail section articulated to control a pitch of the aircraft.
Figure 3B:
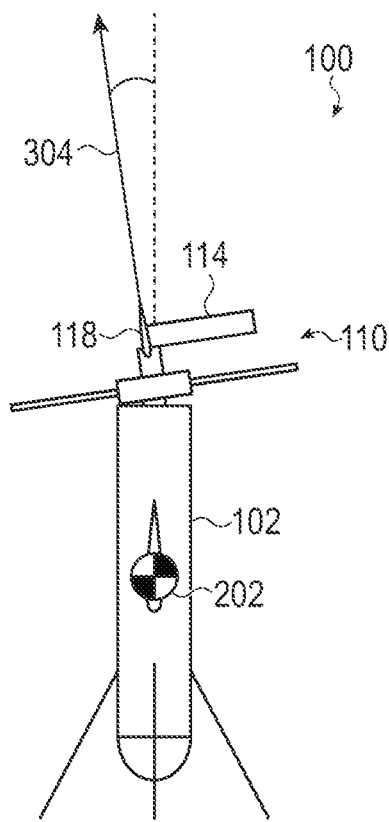
Figure 3C:
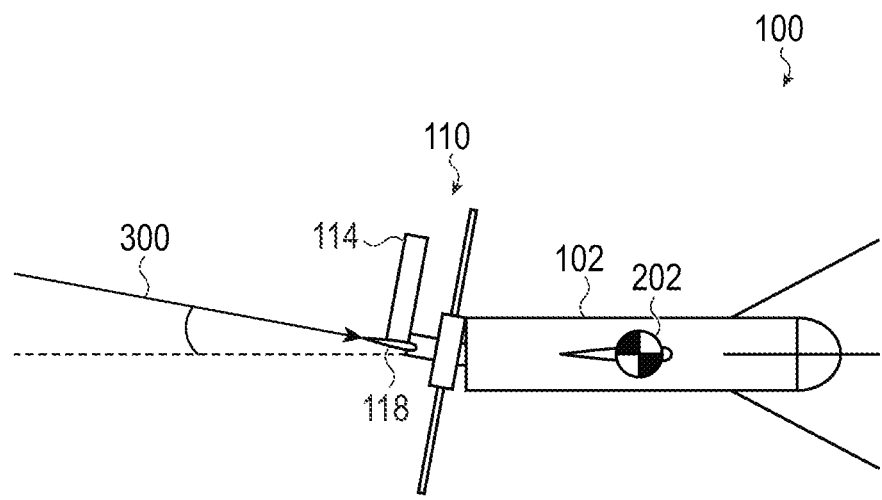

For example, FIGS. 3A and 3C, which may represent the aircraft 100 while in wing-borne flight, illustrate how rotation of the tail section 110 about the second axis of rotation causes the angle of attack of the horizontal stabilizer(s) 118 to change in a manner that produces a pitch moment on the aircraft 100 (e.g., in a manner similar to an elevator or stabilator). Additionally, the articulation of the tail section 110 changes the direction of the thrust vector 300 of the propulsion system such that the thrust vector is offset from the center of mass 202 of the aircraft 100. This offset may produce a pitch moment in addition to the pitch moment produced by the change in angle of attack of the stabilizer(s) 118. As shown in FIGS. 3A and 3C, the thrust vector 300 is acting in a forward direction (e.g., generally towards the nose of the aircraft 100).

Figure 3D:
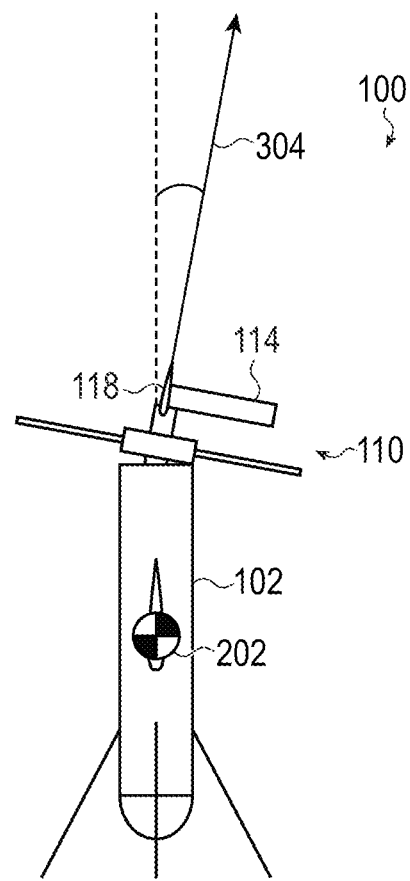

FIGS. 3B and 3D illustrate how the same type of articulation of the tail section 110 that is used to control the pitch of the aircraft 100 during wing-borne flight may be used to control the pitch of the aircraft 100 during rotor-borne flight, such as during take-off and landing operations, hover operations, or the like. For example, as shown in FIGS. 3B and 3D, which may represent the aircraft 100 during a vertical take-off operation in which the longitudinal axis or roll axis 123 of the aircraft 100 is substantially perpendicular to a ground reference, the rotation of the tail section 110 about the second axis of rotation causes the thrust vector 304 to be angled relative to a longitudinal or roll axis of the aircraft 100. This variation in thrust vector angle, which also corresponds to the thrust vector being offset from the center of mass 202 of the aircraft 100, may control the pitch of the aircraft 100 and/or change the direction of motion of the aircraft 100 during rotor-borne flight operations. As shown in FIGS. 3B and 3D, the thrust vector 304 is acting in an aft direction, resulting in the aircraft 100 lifting or hovering vertically relative to the ground in a nose-down orientation.

As demonstrated in FIGS. 2A-3D, pitching and yawing moments on the aircraft may be produced by changing the direction of the thrust vector, as well as by changing the angle of attack of the stabilizer(s). Further, the aircraft 100 and tail section 110 are configured such that a given articulation of the tail section 110 causes both systems (e.g., the propulsion system and the stabilizers) to produce a moment in the same direction. As one illustrative example, rotating or otherwise orienting the tail section 110 downwards relative to the fuselage 102 (as shown in FIG. 3C) results in the stabilizers producing an upwards pitching moment (due to the change in angle of attack of the stabilizers), and also results in the propulsion system producing an upwards pitching moment (due to the offset between the thrust vector and the center of mass of the aircraft 100). This configuration confers numerous benefits to the operation and construction of the aircraft 100. For example, as described herein, the aircraft can employ fewer mechanical systems, as the cooperative moments from the thrust vectoring and the stabilizers can be produced by articulating the same structure in the same way. Additionally and relatedly, the aircraft can employ fewer control systems and/or control schemes, as the same actuator outputs (e.g., an actuator output to articulate the tail section in a particular direction) causes both the propulsion system and the stabilizers to produce cooperative pitching or yawing moments. As used herein, cooperative moments refer to moments that tend to change the attitude and/or direction of flight of an aircraft in the same manner. Thus, using FIG. 3C as an example, the moment caused by changing the thrust vector and the moment caused by changing the angle of attack of the stabilizer(s) both tend to pitch the aircraft 100 upwards.

While FIGS. 2A-3D illustrate certain isolated articulations of the tail section 110, it will be understood that the tail section 110 may be rotated about its axes of rotation simultaneously, thus producing compound motions that may produce both pitching and yawing moments simultaneously. Indeed, the articulation system that is configured to articulate the tail section 110 relative to the fuselage 102 or other body structure of the aircraft 100 may be or may include a two-dimensional gimballing mechanism that can articulate the tail section 110 about multiple axes of rotation simultaneously. Example gimballing mechanisms are described herein with respect to FIGS. 7A-8C.

Further, FIGS. 2A-3D illustrate example articulations that may control pitch and yaw of the aircraft 100 in an example with a vertical stabilizer and a perpendicular horizontal stabilizer. In aircraft with different arrangements of stabilizers, fins, wings, or other aerodynamic structures on the articulatable tail section, the particular articulations of the tail section may be different than those shown here. For example, an articulating tail section in accordance with the instant disclosure may be configured to rotate about axes that are not perpendicular, rotate about axes that are not parallel with the pitch and yaw axes of the aircraft 100, translate in one or more directions, or the like.

As described herein, placing both a propulsion system and stabilizers (and/or other aerodynamic yaw- and pitch-control surfaces) on an articulatable tail section allows a single actuation system to be used to control pitch and yaw in multiple flight modes. FIG. 4 illustrates the aircraft 100 executing a take-off operation in which the articulatable tail section 110 is articulated during both a rotor-borne flight mode and a wing-borne flight mode. More particularly, the aircraft 100 may execute a vertical take-off operation 402, which utilizes a rotor-borne flight mode, followed by a transition operation 404 in which the aircraft 100 transitions from the rotor-borne flight mode to a wing-borne flight mode.

In the vertical take-off operation 402, the aircraft 100 may initially be resting in a nose-down configuration on a ground reference 401. The propulsion system then generates thrust in an upward direction, causing the aircraft 100 to lift off the ground and rise to a target altitude 403. During this operation, movement of the aircraft 100 about the pitch and yaw axes may be controlled by articulating or otherwise moving the tail section 110 relative to the body structure 101 in order to change the direction of the thrust vector. These pitch and yaw manipulations may be used to help maintain the aircraft 100 in a target attitude (e.g., substantially vertical), to change the direction of flight and/or position of the aircraft, or the like. During rotor-borne flight modes, such as the vertical take-off operation 402, the propulsion system can be understood as providing lift as well as thrust for the aircraft 100.

Once the target altitude 403 is reached, the aircraft 100 executes a transition operation 404 in which the aircraft 100 transitions from rotor-borne flight to wing-borne flight. In some cases, as described with respect to FIG. 5, this transition includes changing the tuning parameters of a control system that controls the articulations of the tail section for pitch and yaw control.

Returning to FIG. 4, when the target altitude 403 is reached, the propulsion system may transition from producing thrust and lift in the upward (or aft) direction to producing thrust in the forward direction (e.g., towards the ground reference), thereby causing the aircraft 100 to begin travelling generally downward. The transition from an aft-directed thrust to a forward-directed thrust may also result in the aircraft 100 beginning to travel towards the ground due to the acceleration of gravity.

As the aircraft 100 gains velocity, aided by both the forward thrust from the propulsion system and gravity, the fixed wings of the aircraft 100 begin to generate lift, allowing the aircraft 100 to pitch up into a wing-based flight mode. During the transition operation, pitch and yaw control is provided by articulating the tail section 110, as described herein, to change the angle of attack of the stabilizers, change the thrust vector angle, and thus change the attitude and/or direction of flight of the aircraft 100.

Figure 5:
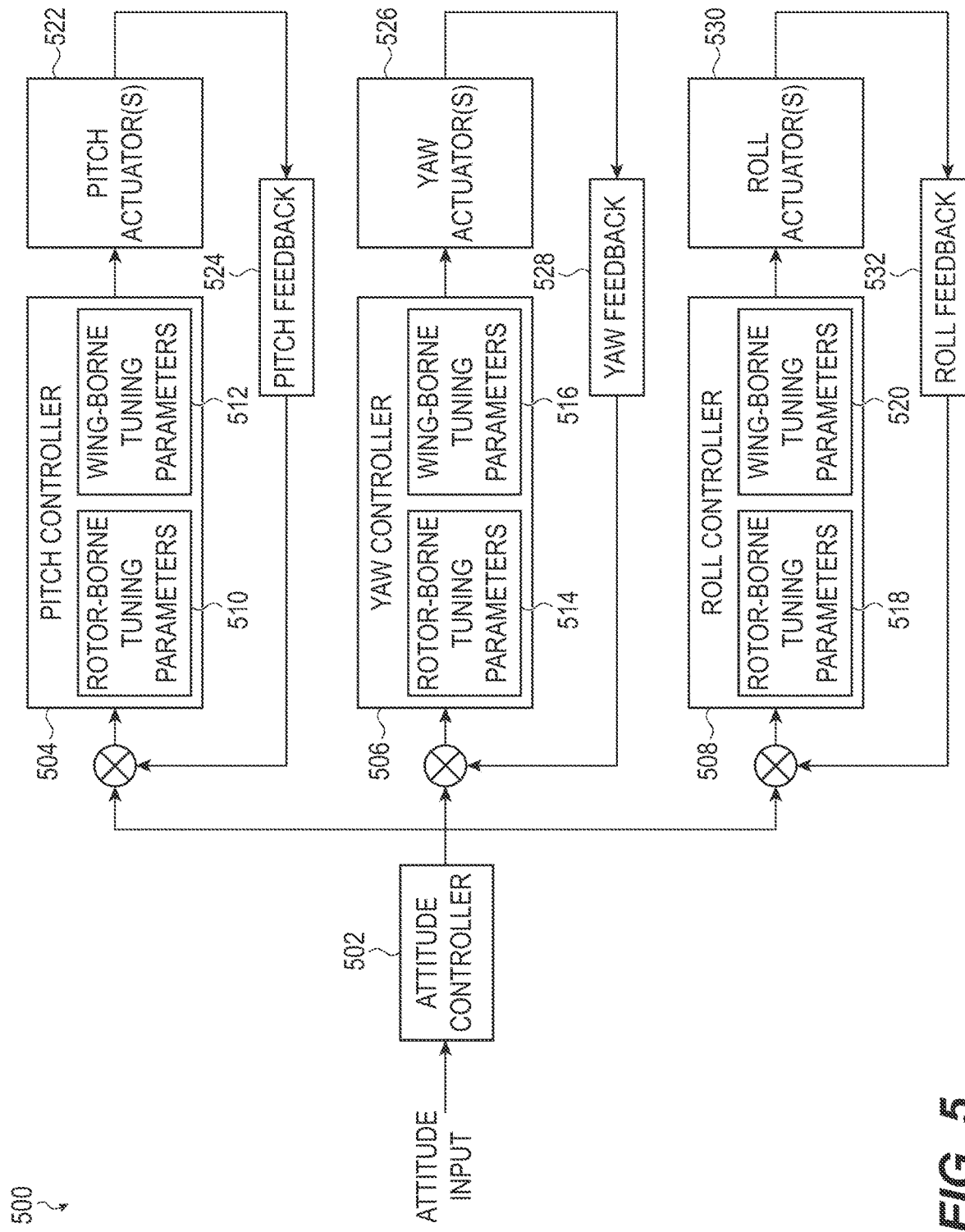
FIG. 5 illustrates an example attitude controller for an aircraft with an articulatable tail section.

FIG. 5 illustrates an example attitude controller 500 that may be executed by the aircraft 100 in order to control the attitude of the aircraft 100. The controller 500 may be implemented by one or more processing systems onboard the aircraft 100. The processing systems may include, for example, one or more processors and memory storing instructions that, when executed by the processor, control various operations of the aircraft 100, including flight operations, communications operations (e.g., communicating with a base station, communicating with a remote operator device), mission and/or payload operations (e.g., controlling when to deploy a payload, controlling onboard cameras), or the like. Flight operations may include, for example, controlling the propulsion system (e.g., controlling rotor speed, rotor blade pitch or collective, and/or other propulsion system parameters), controlling flight control surfaces and thrust vectoring systems (e.g., controlling the articulation of a tail section, ailerons, and/or other flight control surfaces), and the like.

The controller 500 illustrates a portion of an overall aircraft control scheme that controls the attitude of the aircraft 100. An attitude input may be provided to an attitude controller 502. The attitude input may be provided by a remote operator (e.g., via remote control input), by an autonomous guidance system, or by an onboard pilot (in the case the aircraft 100 is a manned aircraft). The attitude input may correspond to an absolute attitude setpoint, a change in attitude (e.g., a command for a change in attitude of a certain amount), or the like.

The attitude controller 502 may determine, based on the attitude input and optionally attitude information from one or more sensing systems (e.g., gyroscopes), setpoints for the pitch, yaw, and roll of the aircraft 100. The setpoints may be provided to the pitch controller 504, yaw controller 506, and roll controller 508, respectively. The pitch, yaw, and roll controllers may compare their respective setpoints to the actual pitch, yaw, and roll of the aircraft (as provided by the pitch feedback 524, yaw feedback 528, and roll feedback 532), and issue signals to the pitch actuator(s) 522, yaw actuator(s) 526, and roll actuator(s) 530 based on the setpoints and the feedback. The pitch feedback 524, yaw feedback 528, and roll feedback 532 may be provided by an attitude feedback system, which may use gyroscopes, inertial measurement units, or any other suitable techniques or systems for sensing or otherwise determining an actual attitude of the aircraft.

The roll actuator(s) 530 may be configured to control movement of ailerons (e.g., the ailerons 106, FIG. 1), or any other flight control surface(s) configured to affect the roll of the aircraft 100. In cases where roll control is provided by or includes differential torque provided by multiple rotors or propellers, the roll actuator(s) may include the rotors or propellers (and/or associated motors or engines) that are configured to generate the differential torque. In cases where both ailerons and differential torque are used to roll the aircraft 100, the controller 500 may include separate roll controllers for each system.

As described herein, the pitch and yaw actuators 522, 526 may be configured to articulate the tail section 110 of the aircraft 100 relative to the body structure 101 and/or fuselage 102 of the aircraft 100. Thus, for example, a command to change the pitch of the aircraft 100 in either wing- or rotor-borne flight modes may result in a signal being sent to an actuator that articulates the tail section 110 to produce a pitch moment of the aircraft 100 (e.g., as shown in FIGS. 3A-3D). Similarly, a command to change the yaw of the aircraft 100 in either wing- or rotor-borne flight modes may result in a signal being sent to an actuator that articulates the tail section 110 to change the yaw of the aircraft 100 (e.g., as shown in FIGS. 2A-2D).

Further, because the pitch and yaw of the aircraft 100 are controlled by the same actuators in both wing- and rotor-borne flight, and further because an articulation of the tail section causes both the thrust vectoring and stabilizers to produce cooperative pitching and yawing moments, the same controller may be used for both flight modes. For example, the same closed-loop control algorithm may be used in both flight modes. In some cases, however, the tuning parameters (or tuning constants) for the closed-loop control algorithm may differ for the pitch and yaw controllers in the different flight modes. For example, the rotor-borne tuning parameters 510 for the pitch controller may include a first set of tuning parameters, while the wing-borne tuning parameters 512 may include a second set of tuning parameters. Similarly, the rotor-borne tuning parameters 514 for the yaw controller may include a third set of tuning parameters, while the wing-borne tuning parameters 516 may include a fourth set of tuning parameters. The tuning parameters for the pitch, yaw, and roll controllers may include parameters such as a proportional gain, an integral gain, and a derivative gain (where the closed-loop control algorithm uses a proportional-integral-derivative ("PID") control loop), among other possible parameters.

The closed-loop pitch and yaw controllers (and optionally a closed-loop roll controller) may be configured to change between the rotor-borne tuning parameters and the wing-borne tuning parameters when the aircraft 100 transitions between a rotor-borne flight mode and a wing-borne flight mode. Such transitions may occur during various flight operations. For example, as described above with respect to FIG. 4, the aircraft 100 may execute a take-off operation in which the aircraft 100 takes off in a vertical orientation using a rotor-borne flight mode, and then transitions to a wing-borne flight mode. The pitch and yaw controllers may transition from using the rotor-borne tuning parameters to using the wing-borne tuning parameters in conjunction with the transition from the rotor-borne portion of the flight to the wing-borne portion. In some cases, the transition occurs in response to detecting a change in the aircraft's motion, such as from moving in a rearward direction to moving in a forward direction, or in response to detecting a certain aerodynamic condition (e.g., corresponding to the fixed wings generating a threshold amount of lift). The transition between tuning parameters may occur before, during, or after the transition between rotor-borne and wing-borne flight modes.

Transitioning between wing-borne and rotor-borne flight (and the consequent changeover in the tuning parameters being used) may occur during other flight operations as well, such as during a landing operation in which the aircraft 100 transitions from wing-borne flight to rotor-borne flight to perform a vertical landing maneuver. As another example, the aircraft 100 may fly to a target location using wing-borne flight, and then transition to a hover operation using rotor-borne flight to maintain station at the target location (e.g., to capture and/or relay images, provide communication relay functions, etc.). The aircraft 100 may transition between the tuning parameters as appropriate for each mode of flight.

In some cases, the relative impact of the thrust vectoring and the change in angle of attack of the stabilizer(s) on the pitch and yaw of the aircraft depends in part on the airspeed of the aircraft. For example, at higher airspeeds, changing the angle of attack of the stabilizers may have more control authority over the pitch and/or yaw of the aircraft than thrust vectoring from the propulsion system, whereas at lower airspeeds, the stabilizer(s) may have less control authority than the thrust vectoring. Because both pitch and yaw moments from both systems (stabilizer manipulation and thrust vectoring) are produced by the same articulation of the tail section, the control system can rely on a single controller, regardless of the relative impact of these systems on the attitude of the aircraft. In some cases, however, the tuning parameters for the pitch and yaw controllers (in both wing-borne and rotor-borne flight modes) may be scaled relative to airspeed (or any other suitable parameter) in order to account for the relative differences in contribution to the aircraft moments from the thrust and stabilizer systems.

In some cases, the roll controller may also use the same controller 508 for both rotor-borne and wing-borne flight modes. In such cases, the roll controller 508 may also have a set of rotor-based tuning parameters 518 and wing-based tuning parameters 520, and it may transition between them in the same or similar manner as described above with respect to the pitch and yaw controllers. In some cases, different actuators are used to control roll in different modes of operation. For example, the ailerons 106 may provide roll control during wing-borne flight, while differential torque from a multi-rotor propulsion system may provide roll control during rotor-borne flight. In such cases, the aircraft 100 may use a different control algorithm for each roll-control system. In some cases, both ailerons (or other flight control surfaces) and differential torque from a multi-rotor propulsion system may be used to control the roll axis in both rotor-borne and wing-borne flight modes. In such cases, the roll control algorithms for each roll-control system may include a respective set of wing-borne and rotor-borne tuning parameters, and may transition between them based on the particular flight mode being used.

In some cases, the relative impact of a roll-control system on the roll of the aircraft depends in part on the airspeed of the aircraft. For example, at higher airspeeds, ailerons may have more control authority over the roll of the aircraft than differential torque from the propulsion system, whereas at lower airspeeds, the ailerons may have less control authority than the differential torque. Accordingly, the roll controller 508 may be configured to adjust the balance of roll control outputs (e.g., between ailerons and differential torque) based on the airspeed of the aircraft. As one nonlimiting example, the aircraft may rely fully on differential torque when the airspeed is zero, and gradually increase the ratio of differential torque and aileron movements as the airspeed increases, until a certain airspeed is reached.

The attitude controller 500 described above is an illustrative example of how attitude control may be achieved in an aircraft having an articulatable tail section for pitch and yaw control. However, other control architectures may also be used to control the attitude of such an aircraft. The controller 500 may be employed in other types of aircraft as well.

Figure 6A:
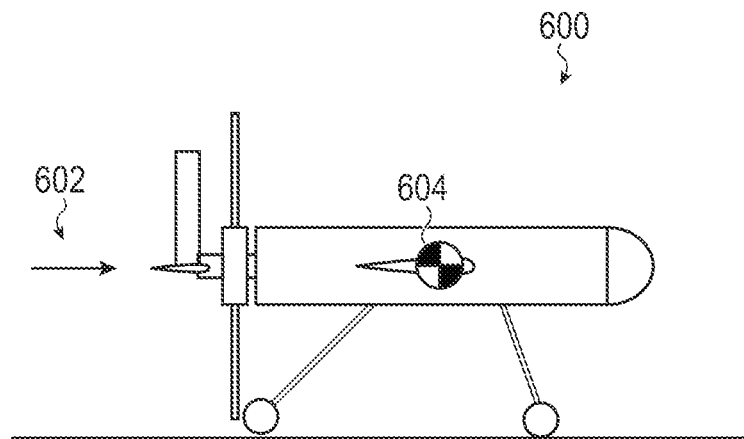
FIGS. 6A-6B illustrate an example rolling take-off operation of an aircraft with an articulatable tail section.
Figure 6B:
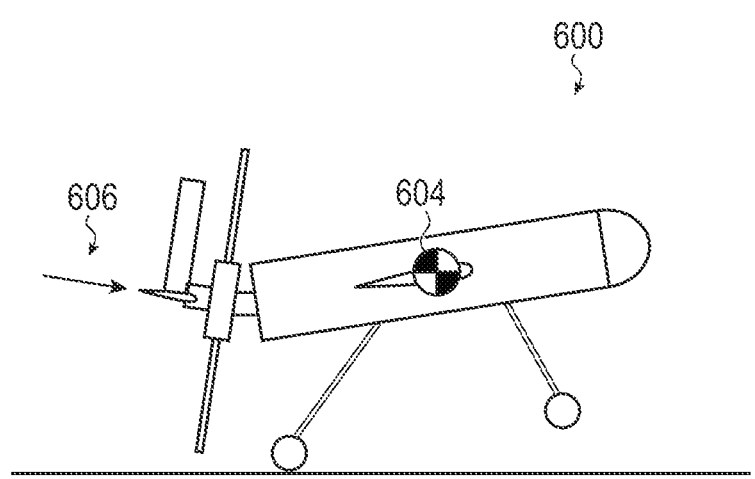

The articulatable tail section as described herein may also be used during horizontal or rolling take-off and landing operations to provide attitude and/or directional control for the aircraft. FIGS. 6A-6B illustrate an example aircraft 600 performing a rolling take-off operation in which a tail section is articulated to provide pitch control during the take-off operation. The aircraft 600 is shown with a landing gear to facilitate rolling take-off and landing, but may otherwise be an embodiment of the aircraft 100 and include an articulatable tail section as described herein.

FIG. 6A illustrates the aircraft 600 using the propulsion system on the tail section to generate thrust (indicated by arrow 602), causing the aircraft 600 to move along the ground (e.g., corresponding to a ground run phase of take-off). At the moment represented in FIG. 6A, the tail section may be in a neutral or unarticulated state, in which the thrust vector is substantially aligned with the center of mass 604 of the aircraft and the stabilizer(s) are not generating significant pitching moments. (While not shown in FIG. 6A, the thrust vector and lift may be modified or changed during this phase of the take-off and need not remain in the neutral position as shown.)

FIG. 6B illustrates the aircraft 600 beginning to lift off of the ground. As shown in FIG. 6B, the tail section of the aircraft 600 is angled downward relative to the body section. This articulation may produce a pitching moment by changing the angle of attack of the stabilizer(s) of the tail section, and/or by changing the thrust vector from the propulsion system, both of which may ultimately affect the attitude and/or direction of the aircraft 600. More particularly, the downward angle of the tail section (as depicted in FIG. 6B) may cause the stabilizer(s) to pitch the nose of the aircraft up, thereby causing the aircraft to begin leaving the ground and to enter a transition or climb phase of the take-off operation. Further, the downward angle of the tail section results in the thrust vector (indicated by arrow 606) becoming offset from (e.g., not passing directly through) the center of mass 604 of the aircraft 600. This thrust vector direction may impart a pitching moment to the aircraft 600, thereby causing the aircraft to begin leaving the ground and enter the transition and/or climb phase.

As noted herein, attitude control for an aircraft may be provided by articulating a tail section that includes both stabilizer(s) and a propulsion system. Such articulations may be facilitated and/or defined by an articulation system that rotates the tail section about one or more rotational axes. In some cases, the articulation system includes a gimballing mechanism that articulatably couples the tail section (which includes the propulsion system and/or the stabilizer(s)) and is configured to define the particular rotational motion that the tail section is capable of.

Because the tail section may include relatively heavy components such as motors, rotors, gear systems, electrical components, stabilizer(s), and the like, the articulation system, and more particularly the gimballing mechanism, may be configured to move the tail section according to a geometry that minimizes or otherwise reduces the amount of force required to move the tail section. For example, as described above, the gimballing mechanism may be configured so that the tail section rotates about an axis that passes through (or is proximate to) the center of mass of the tail section. More particularly, the moment of inertia of the tail section is lowest about its center of mass, and as such, it requires less force to rotate the tail section about its center of mass as compared to other locations of the tail section. By selecting the rotational axes that minimize the force required to rotate or otherwise articulate the tail section, the articulations described herein can be produced using smaller and less powerful actuators, which can increase the efficiency and range of the aircraft, reduce overall weight of the aircraft, reduce manufacturing costs, increase available payload capacity (both in weight and size), and the like.

Figure 7A:
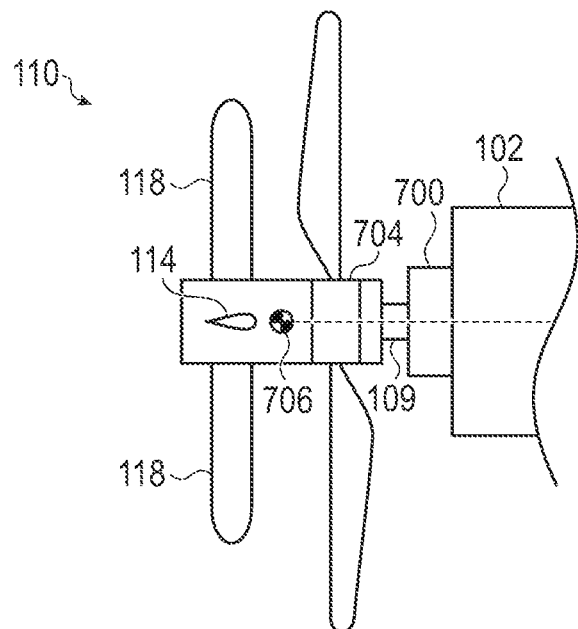
FIGS. 7A-7D illustrate a portion of an aircraft with an articulatable tail section.

FIGS. 7A-7D illustrate example articulations of the tail section 110 of the aircraft 100 about the center of mass 706 of the tail section. For example, FIG. 7A is a top view of a portion of the aircraft 100, illustrating the fuselage 102, the tail section 110, and an articulation system 700 that articulatably couples the tail section 110 to the fuselage 102. The tail section 110 includes a tail structure 109 (which may include a shaft or other support structure), a propulsion system 704 (which may include rotors, motors, gear systems, etc.) and stabilizer(s) (e.g., stabilizers 114, 118). The tail section 110 may have a center of mass 706, though this is merely an example, and the actual location of the center of mass on any given tail section will be defined by the particular construction of that tail section. Further, while FIGS. 7A-7D illustrate a particular stabilizer configuration and a propulsion system that includes a single rotor, these are merely for example purposes. In other implementations, other types of stabilizer configurations (e.g., more, fewer, and/or different arrangements of stabilizers) and other types of propulsion systems (e.g., multi-rotor systems, turbine or jet systems, rocket engines, etc.) may be implemented.

FIG. 7A illustrates the tail section 110 in a neutral or unrotated position. In some cases, this position may correspond to the thrust vector from the propulsion system being aligned with (e.g., passing through) the center of mass of the body section (e.g., the fuselage) of the aircraft 100, and the stabilizer(s) having a zero degree angle of attack (or otherwise oriented to produce no lift).

Figure 7B:
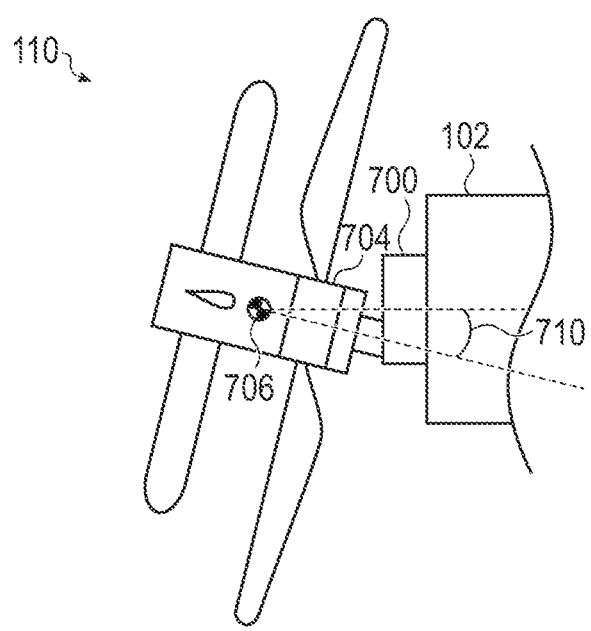

FIG. 7B illustrates the tail section 110 having been rotated a first amount (e.g., angle 710) about an axis of rotation that passes through the center of mass 706. As depicted in FIG. 7B, the axis of rotation (which may be referred to as the first axis of rotation) extends into the page and is parallel to a yaw axis of the aircraft 100. The articulation of the tail section 110 about the first axis of rotation as shown in FIG. 7B may be configured to control the yaw of the aircraft 100 in both wing-borne and rotor-borne flight modes, as described herein.

Figure 7C:
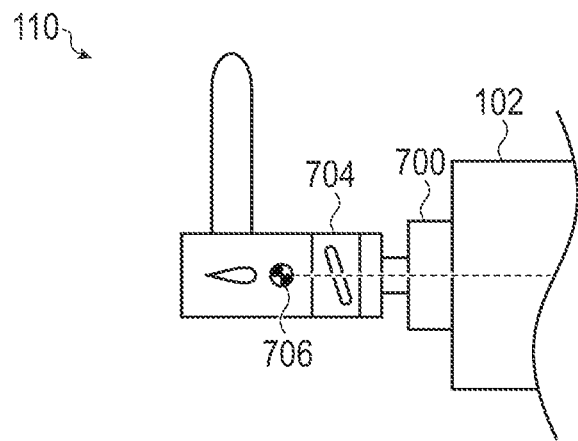
Figure 7D:
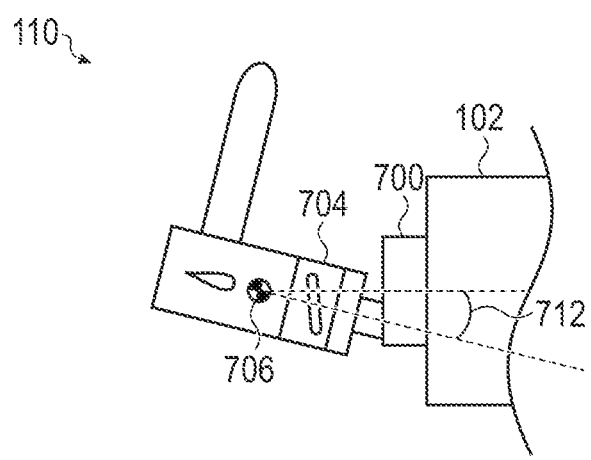

FIGS. 7C-7D are side views of a portion of the aircraft 100, illustrating a rotation of the tail section 110 that may be used to control the pitch of the aircraft 100. In particular, FIG. 7C illustrates the tail section 110 in a neutral or unrotated position. In some cases, this position may correspond to the thrust vector from the propulsion system being aligned with (e.g., passing through) the center of mass of the body section (e.g., the fuselage) of the aircraft 100, and the stabilizer(s) having a zero degree angle of attack (or otherwise oriented to produce no lift).

FIG. 7D illustrates the tail section 110 having been rotated a first amount (e.g., angle 712) about a second axis of rotation that passes through the center of mass 706. The second axis of rotation may be perpendicular to the first axis of rotation, and may be parallel to a roll axis of the aircraft 100. The articulation of the tail section 110 about the second axis of rotation as shown in FIG. 7D may be configured to control the pitch of the aircraft 100 in both wing-borne and rotor-borne flight modes, as described herein.

An articulation system for articulating a tail section of an aircraft may include various components, systems, structures, etc., that perform the functions of the articulation system. For example, the articulation system may structurally couple the tail section to the body structure of the aircraft, and may also define the way that the tail structure moves relative to the body structure. The articulation system may also include actuators (e.g., motors) that physically produce the tail section articulations.

When a tail section of an aircraft, such as the tail section 110, is articulated during flight, dynamic forces may act on the tail section that impact the tail section's resistance to rotation. For example, aerodynamic forces acting on the stabilizer(s) may change as the tail section is rotated, and those changes may affect the tail section's resistance to rotation (including potentially increasing, decreasing, or otherwise modulating the resistance to rotation). As another example, the gyroscopic effect of a spinning rotor on a tail section may affect the tail section's resistance to rotation (e.g., increasing the resistance and/or imparting other forces onto the tail section due to gyroscopic precession). Such forces may act on (or may be resolvable as a force acting at or through) the tail section at a location that is different than the center of mass. Accordingly, in some cases an articulation system is configured to rotate or otherwise articulate the tail section in a manner that minimizes or substantially minimizes the amount of force required to perform the target articulations. For example, a point or path of minimum rotational resistance may be identified for a given tail section (which may be at different locations of the tail section throughout the articulation of the tail section), and the articulation system may be configured so that the tail section rotates about (or substantially about) the point of minimum rotational resistance or otherwise follows the path of minimum rotational resistance. The point or path of minimal rotational resistance may account for both the mass of the tail section and aerodynamic, gyroscopic, and/or other forces influencing the tail section. For ease of reference, the instant discussion refers to rotations about the center of mass, though it will be understood that the same principles apply to rotations about a point of minimal rotational resistance.

Furthermore, rotations of a tail section about different axes of rotation during flight operations may result in different dynamic forces acting on the tail section. As one example, rotations of the aircraft about the pitch axis (e.g., as shown in FIGS. 7C-7D) may produce a greater aerodynamic resistance to rotation than rotations of the aircraft about the yaw axis 121 (e.g., as shown in FIGS. 7A-7B). Accordingly, the actuation system may be configured to rotate the tail section about rotational axes that are not coincident. As one nonlimiting example, the axis of rotation for a pitching articulation may be further aft than the axis of rotation for a yawing moment. In such cases, the axes of rotation may still be perpendicular to one another, though they may not intersect.

In some cases, an articulation system includes a gimballing mechanism that structurally couples the tail section to the body portion of the aircraft and also defines the motion characteristics of the tail section. The gimballing mechanism may facilitate articulation of a tail section about two perpendicular axes of rotations that each extend through the center of mass of the tail section, as described herein.

Figure 8A:
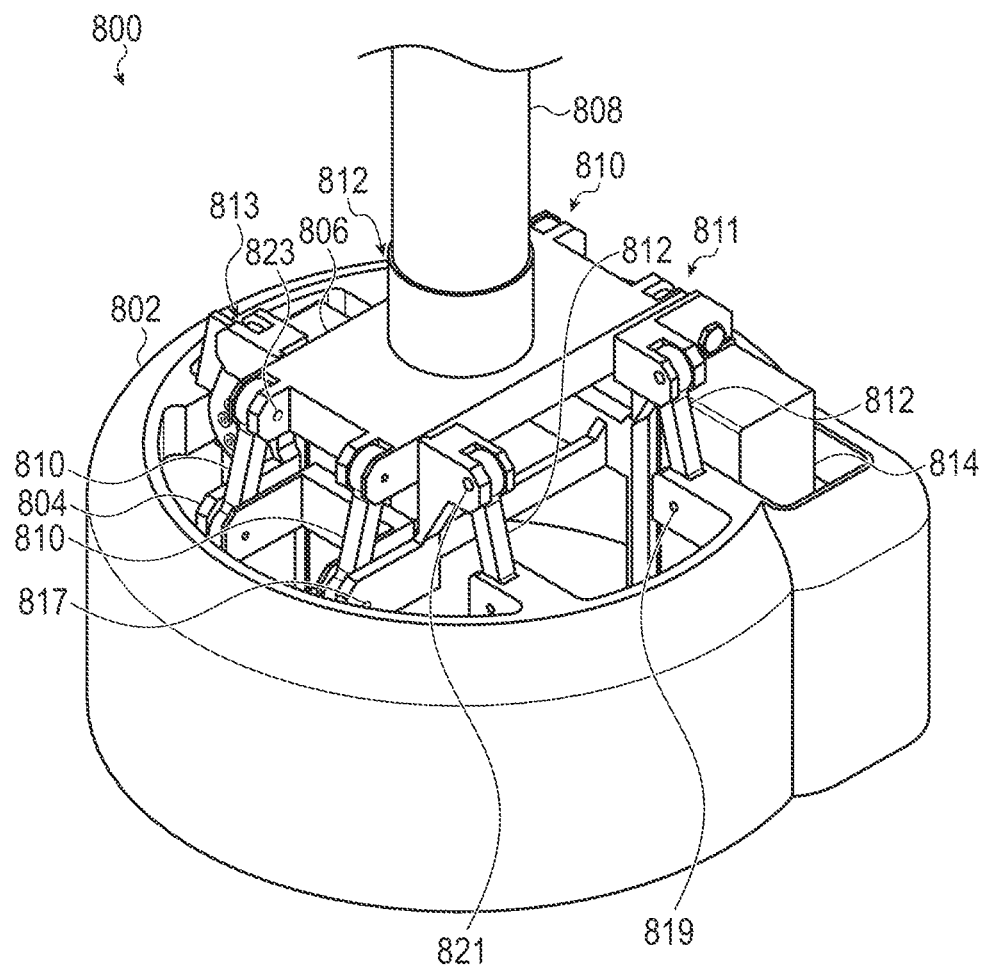
FIGS. 8A-8C illustrate an example gimballing mechanism for an aircraft with an articulatable tail section.
Figure 8B:
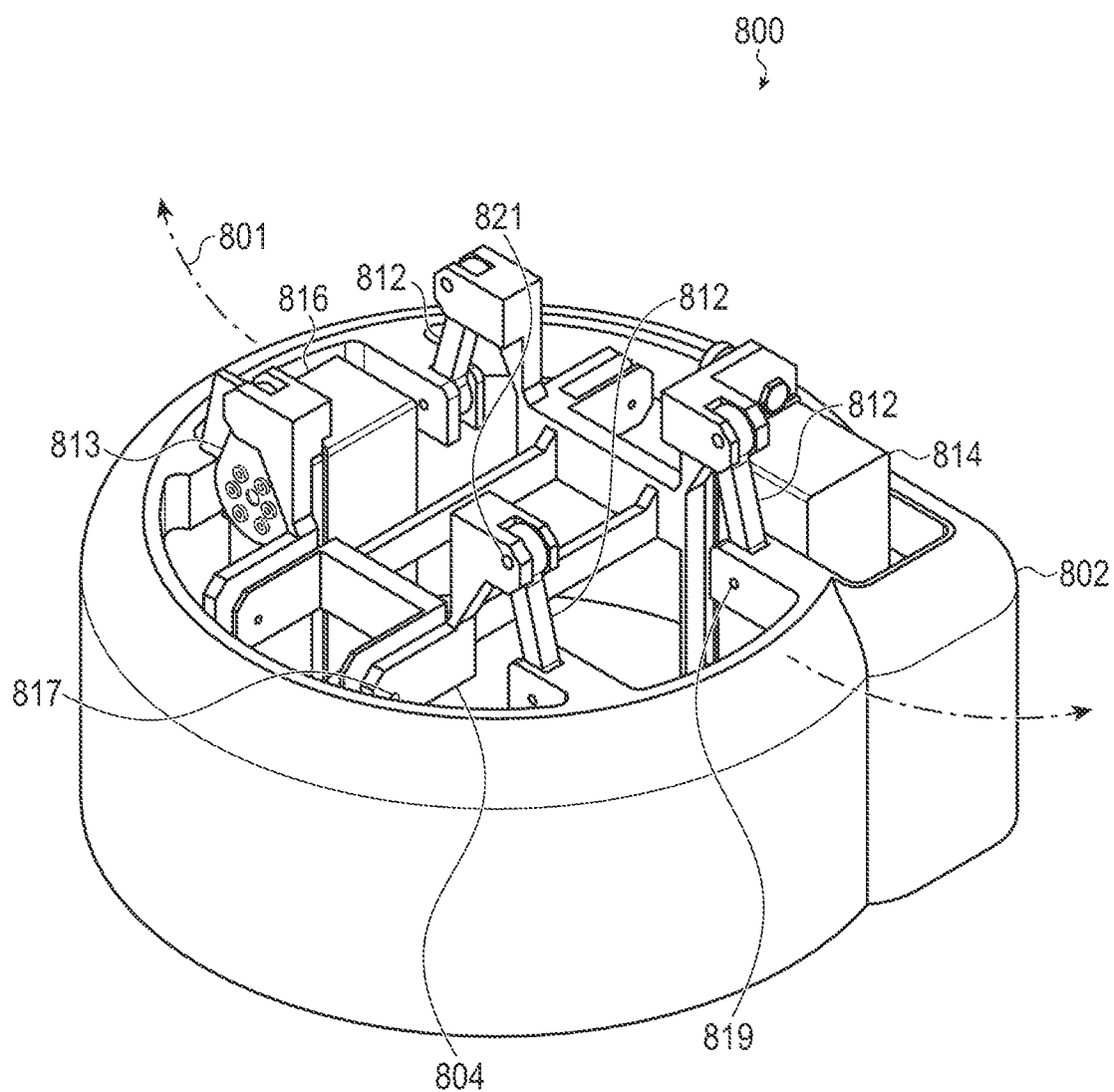
Figure 8C:
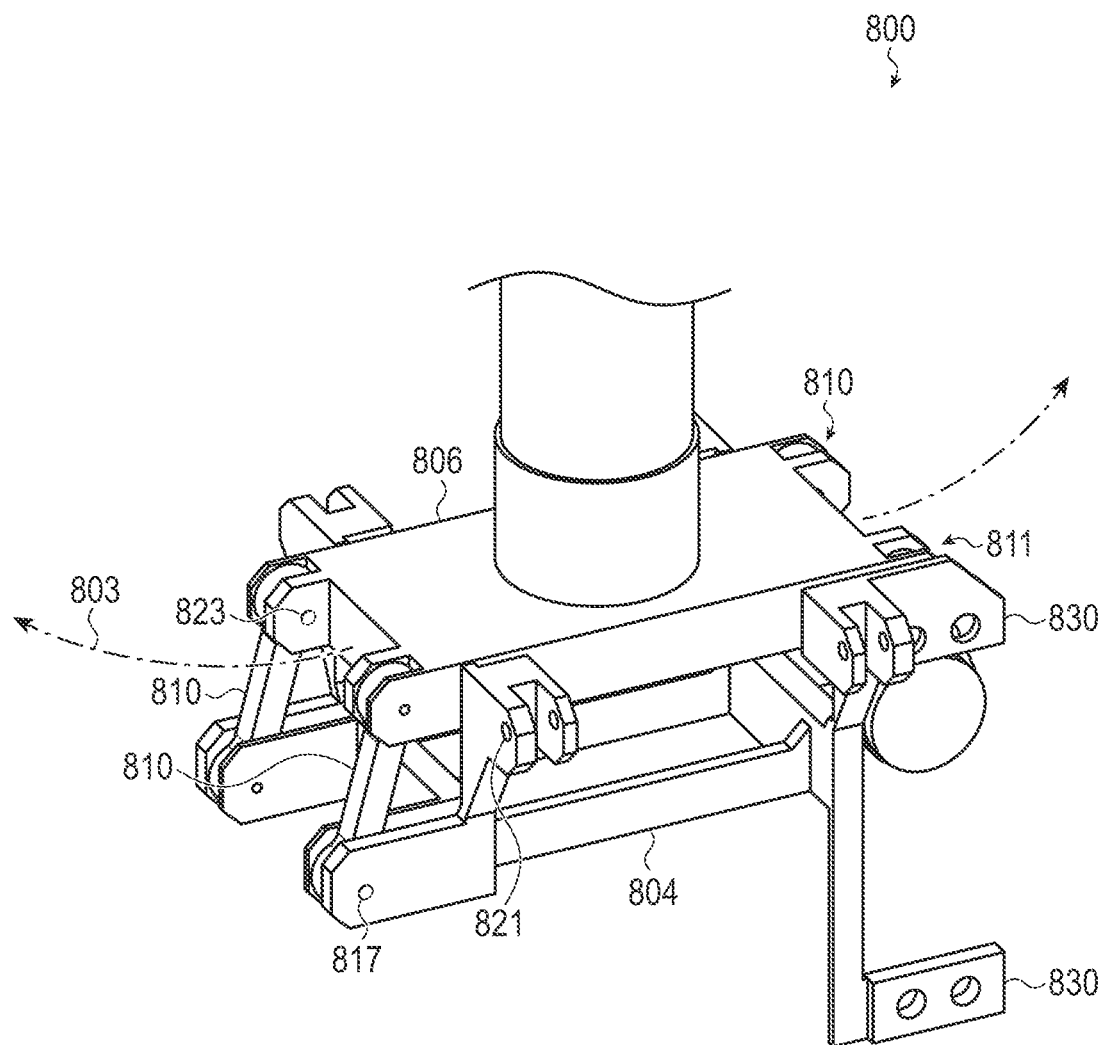

FIGS. 8A-8C illustrate an example gimballing mechanism 800 that may be used in an articulation system as described herein. The gimballing mechanism 800 may be a nested four-bar mechanism that uses a first four-bar mechanism to define the rotation of the tail structure about a first axis of rotation, and a second four-bar mechanism that is mounted to and/or integrated with the first four-bar mechanism to define the rotation of the tail structure about the second axis of rotation.

The gimballing mechanism 800 may include a support structure 802, which may be coupled to or part of the body structure of the aircraft. The gimballing mechanism 800 also includes a tail structure 808, such as a rod, shaft, truss structure, or the like, to which components of the tail section may be coupled. For example, a propulsion system (or portion thereof) and one or more stabilizer(s) may be coupled to the tail structure 808, as described herein.

FIG. 8B illustrates a portion of the gimballing mechanism 800 that defines a first four-bar mechanism. The support structure 802 may serve as a base structure of a first four-bar mechanism, and may therefore also be referred to as a base structure 802. A first frame structure 804 may be coupled to the support structure 802 via a set of links 812, 813. The base structure 802, the first frame structure 804, and the links 812, 813 define the first four-bar mechanism of the gimballing mechanism 800. More particularly, the links 812 are pivotally coupled to the base structure 802 and the first frame structure 804 and allow the first frame structure 804 to articulate relative to the base structure 802. As described below, the link 813 may be an actuation link that is coupled to the first frame structure 804 and a first actuator 816 (and the first actuator 816 may be coupled to the base structure 802).

The particular dimensions of the base structure 802, the links 812, 813, and the first frame structure 804 may be selected such that the first frame structure 804 (and thus the tail section) rotates about the center of mass of the tail section, or other selected axis of rotation. FIG. 8B, for example, illustrates an example arc 801 that represents the motion of the first frame structure 804 relative to the base structure 802, as defined by the geometry of the first four-bar mechanism. This motion may cause the tail structure to rotate about its center of mass, as described with respect to FIGS. 7A-7D, for example.

FIG. 8B illustrates one example configuration of the frame structure, base structure, and links of a four-bar mechanism. It will be understood that the particular dimensions of the frame structure, base structure, and links (and, in particular, the distances between the pivot axes where the links and the base and frame structures are coupled) may be selected based on the location of the center of mass of the tail section (or other selected axis of rotation) of any aircraft in which the gimballing mechanism 800 is incorporated.

The first four-bar mechanism may be actuated by any suitable actuator or actuation system that imparts a force on a component of the first four-bar mechanism to induce relative movement between the first frame structure 804 and the base structure 802. As shown in FIG. 8A, the first four-bar mechanism includes a first actuation link 813 that serves as one of the links of the four-bar mechanism, and is coupled to a first actuator 816 that imparts a force to the first actuation link 813 and causes the first frame structure 804 to move relative to the base structure 802. In other examples, other types of actuators and/or actuation systems may be used, such as a linear actuator, separate from the actuation links, that is coupled to the base structure 802 and the first frame structure 804. The first actuator 816, which may be a servo motor, may be controlled by a controller of the aircraft to articulate the pitch and/or yaw of the tail section. More particularly, the first actuator 816 may correspond to the pitch actuator(s) 522 and/or the yaw actuator(s) 526 in the controller 500 of FIG. 5.

FIG. 8C illustrates the portion of the gimballing mechanism 800 that defines a second four-bar mechanism. The second four-bar mechanism may be nested with the first four-bar mechanism. For example, the first frame structure 804 of the first four-bar mechanism may be the base structure of the second four-bar mechanism, and links 810, 811 may be pivotally coupled to the first and second frame structures 804, 806 to allow the second frame structure 806 to articulate relative to the first frame structure 804. Thus, the first frame structure 804, the second frame structure 806, and the links 810, 811 may define the second four-bar mechanism.

In some cases, the second four-bar mechanism is configured to produce a rotation of the tail section about an axis of rotation that is perpendicular to the axis of rotation defined by the first four-bar mechanism. Accordingly, the second frame structure 806 may be configured to move along an arc in a plane that is substantially perpendicular to the arc of the first frame structure 804. FIG. 8C illustrates an example arc 803 that represents the motion of the second frame structure 806 relative to the first frame structure 804 and is perpendicular to the arc 801 in FIG. 8B.

The second four-bar mechanism may be actuated by any suitable actuator or actuation system that imparts a force on a component of the second four-bar mechanism to induce relative movement between the first frame structure 804 and the second frame structure 806. As shown in FIG. 8C, the first four-bar mechanism includes a second actuation link 811 that serves as one of the links of the second four-bar mechanism, and is coupled to a second actuator 814 (FIGS. 8A and 8B, omitted from FIG. 8C for clarity) that imparts a force to the second actuation link 811 and causes the second frame structure 806 to move relative to the first frame structure 804 along the arc 803. In other examples, other types of actuators and/or actuation systems may be used, such as a linear actuator, separate from the actuation links, that is coupled to the first frame structure 804 and the second frame structure 806. The second actuator 814, which may be a servo motor, may be controlled by a controller of the aircraft to articulate the pitch and/or yaw of the tail section. For example, in one example implementation, the first actuator 816 (which moves the first four-bar mechanism) corresponds to the pitch axis actuator(s) 522 and controls the pitch of the aircraft, while the second actuator 814 (which moves the second four-bar mechanism) corresponds to the roll axis actuator(s) 526 and controls the roll of the aircraft.

FIG. 8C also illustrates an example actuator mount 830 to which the second actuator 814 may be coupled. The actuator mount 830 is structurally integrated with the first frame structure 804, and the second actuator 814 may be fastened to the actuator mount 830 (e.g., via screws, bolts, etc.). The second actuator 814 may include a rotatable shaft that couples to the second actuation link 811. When the rotatable shaft is rotated, a rotational force is imparted to the second actuation link 811, which ultimately causes the second frame structure 806 to move along the arc 803, as defined by the locations of the pivot points between the first frame structure 804, second frame structure 806, and links 810. The second actuation link may have a same distance between pivot points as the links 810. While FIG. 8C illustrates how the second actuator 814 couples to the gimballing mechanism 800 and imparts motion to the second four-bar mechanism, it will be understood that the first four-bar mechanism may employ a similar structure and/or technique for mounting the first actuator 816 and imparting motion to the first four-bar mechanism. For example, the base structure 802 may include an actuator mount to which the first actuator 816 may be coupled, and the first actuator 816 may be coupled to the actuation link 813 in the same or similar manner as shown in FIG. 8C with respect to the second actuator 814 and actuation link 811.

In some cases, in order to produce both pitching and yawing rotations of the tail section (e.g., distinct rotations about perpendicular axes of rotation), the first and second four-bar mechanisms may be configured to have geometrically equivalent articulation paths that are offset by 90 degrees. In some cases, this is achieved by having the links of the first and second four-bar mechanisms (e.g., links 810 and 812) have equivalent lengths, and have their upper and lower pivot axes within the same planes. For example, as shown in FIGS. 8A and 8B, the lower pivot axis 819 of the link 812 of the first four-bar mechanism (which may be in the same plane as the lower pivot axes of each of the links 812 of the first four-bar mechanism) may be in the same plane as the lower pivot axis 817 of the link 810 of the second four-bar mechanism (which may be in the same plane as the lower pivot axes of each of the links 810 of the second four-bar mechanism). Similarly, the upper pivot axis 821 of the link 812 of the first four-bar mechanism (which may be in the same plane as the upper pivot axes of each of the links 812 of the first four-bar mechanism) may be in the same plane as the upper pivot axis 823 of the link 810 of the second four-bar mechanism (which may be in the same plane as the upper pivot axes of each of the links 810 of the second four-bar mechanism). By positioning the upper pivot axes of each four-bar mechanism in a first plane and positioning the lower pivot axes of each four-bar mechanism in second plane, the first and second four-bar mechanisms may each produce a rotation of the tail structure about the same point, which may correspond to the center of mass of the tail structure as described herein.

The four-bar mechanisms shown herein may be understood to operate according to the geometric principles of four-bar linkages. It is recognized that the four-bar mechanisms shown in FIGS. 8A-8C include more than four structures. For example, the second four-bar mechanism includes the first frame structure 804, the second frame structure 806, three links 810, and an actuation link 811. Nevertheless, the kinematics of the second four-bar mechanism may be equivalent to a four-bar linkage that includes only four "linkages" or "bars." In some cases, pairs of parallel links in the four-bar mechanisms shown in FIGS. 8A-8C may be understood as equivalent to a single linkage in a four-bar linkage. For example, the links 810 on the left-side of FIG. 8C may be kinematically equivalent to a single linkage of a four-bar linkage.

The foregoing example provides one example of a gimballing mechanism that may be used to produce the tail section articulations as described herein. However, the articulations described herein may be achieved with other gimballing mechanisms instead of or in addition to the gimballing mechanism 800. In some cases, other four-bar mechanisms may be used instead of those shown in FIGS. 8A-8C. In such cases, the four-bar mechanisms may be structurally different but kinematically equivalent to the four-bar mechanisms shown in FIGS. 8A-8C. As one limiting example, parallel links of the four-bar mechanisms (e.g., the links 810 on the left side of FIG. 8C, the links 812 on the bottom right portion of FIG. 8B) may be replaced with respective single link members (which may be pivotally coupled to the frame and/or base structures via any number of properly aligned pivots).

In some cases, mechanisms other than four-bar mechanisms may be used to produce the target rotations of the tail section. For example, a pair of nested crank-slider mechanisms may be used to provide the target articulations. As another example, a first sliding frame may be supported on a first set of curved guide rails (or other bearings or guide structures), and a second sliding frame maybe coupled to the first sliding frame via a second set of curved guide rails (or other bearings or guide structures) that are perpendicular to the first set of guide rails. The first and second sets of guide rails may have a curvature that results in a tail section rotating about its center of mass, and the sliding frames may be slid along their respective guide rails by one or more actuators to produce the intended rotations. Other mechanisms and actuators are also contemplated.

The gimballing mechanisms shown and described herein are presented in the context of articulating or gimballing a tail section of an aircraft. However, the gimballing mechanisms described herein, including the mechanism itself and the kinematic and/or geometric principles of rotating a structure about its center of mass, may be applied to other types of vehicles and/or propulsion systems as well. For example, the gimballing mechanisms may be used to articulate a propulsion assembly for an aircraft. A propulsion assembly may be a structure of an aircraft that includes a propulsion system, such as a rotor, propellor, turbine, rocket engine, or the like. For example, the tail section 110 may be an example of a propulsion assembly that may be articulatably coupled to a fuselage or body structure via a gimballing mechanism as described herein. A propulsion system need not be positioned at the tail or otherwise part of a tail section of an aircraft. For example, an aircraft may include a propulsion assembly on a fixed wing structure, and the gimballing mechanism may articulatably couple the propulsion system to the fixed wing structure to provide thrust vectoring capabilities to the propulsion assembly. As another example, a propulsion system may be articulatably coupled to the nose of an aircraft via a gimballing mechanism as described herein. As yet another example, one or more rotors of a rotorcraft, such as a helicopter, multi-rotor rotorcraft (e.g., a quad-copter), or the like, may be articulatably coupled to the body structure of the rotorcraft via gimballing mechanisms as described herein. Further, tail sections or other structures that lack a propulsion system but include flight control surfaces (e.g., vertical and/or horizontal stabilizers) may be articulatably coupled to the body structure of an aircraft via gimballing mechanisms as described herein.

The foregoing discussion describes articulations of the tail section in which the tail section rotates about a center of mass of the tail section. In some cases, the geometric center of rotation produced by an articulation system (e.g., a gimballing mechanism) changes throughout the articulation path. In such cases, the center of rotation (e.g., the axes of rotation) may be coincident or substantially coincident with the center of mass of the tail section at some point throughout its articulation path. For example, the geometric center of rotation of the tail section may be coincident with or substantially coincident with the center of mass of the tail section when the tail section is in a neutral configuration. Further, it will be understood that articulations in which the instantaneous center of rotation of a mechanism moves as the mechanism articulates, the articulation may still be considered a rotational motion or otherwise include a rotational component.

In some cases, the center of rotation of the tail section may be located away from the center of mass of the tail section, while still being located between the proximate end of the tail section (e.g., where the tail section joins the body structure and/or fuselage) and the distal end of the tail section (e.g., the trailing or aft end of the tail section). Such a configuration may require less force and energy to move the tail section (as compared to pivoting the tail section at the point where it joins the body structure and/or fuselage), and thus can facilitate the use of smaller, lighter, less powerful, and/or more efficient actuation systems. For example, as noted above, a tail section may be articulated about a point of minimum rotational resistance, which may account for the center of mass of the tail section, gyroscopic forces due to spinning rotors or other masses, aerodynamic forces acting on stabilizers or other surfaces of the tail section, and the like.

In some cases, the center of rotation of the tail section (e.g., the axes of rotation of the tail sections) is located within a zone that extends fore and aft of the center of mass by 10% or less of the length of the tail section (e.g., from the proximate end to the distal end of the tail section). In some cases, the center of rotation of the tail section (e.g., the axes of rotation of the tail sections) is located within a zone that extends fore and aft of the center of mass by 20% or less of the length of the tail section (e.g., from the proximate end to the distal end of the tail section).

As noted above, an aircraft as described herein may include a propulsion system that is reversible to produce both forward-directed thrust and aft-directed thrust (as shown and described with respect to FIGS. 2A-4). In some cases, the propulsion system includes one or more rotors that can be rotated in one rotational direction to produce thrust in a first direction (e.g., forward) and rotated in a second (opposite) direction to produce thrust in a second direction (e.g., aft). Additionally, the rotor blades may have variable collective blade angles, such that the blade angles can be changed in conjunction with the change in rotational direction of the rotor. As used herein, a blade angle of a rotor blade refers to the angle of attack of the rotor blade, and collective blade angle refers to a blade angle that is common to all rotor blades of a rotor (e.g., when rotor blades of a rotor are oriented at a collective blade angle, each rotor blade of the rotor is oriented at the same or substantially the same blade angle or angle of attack).

Figure 9A:
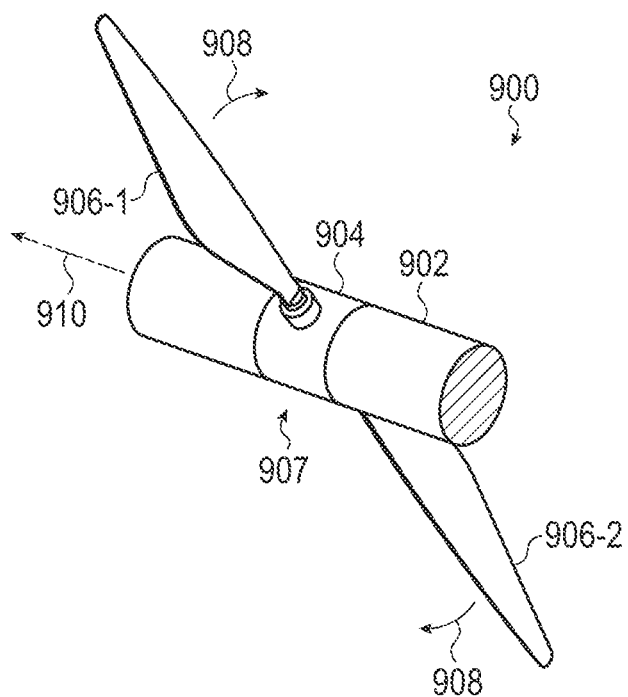
FIGS. 9A-9C illustrate a portion of an example propulsion system with reversible rotation directions and collective blade angle.
Figure 9B:
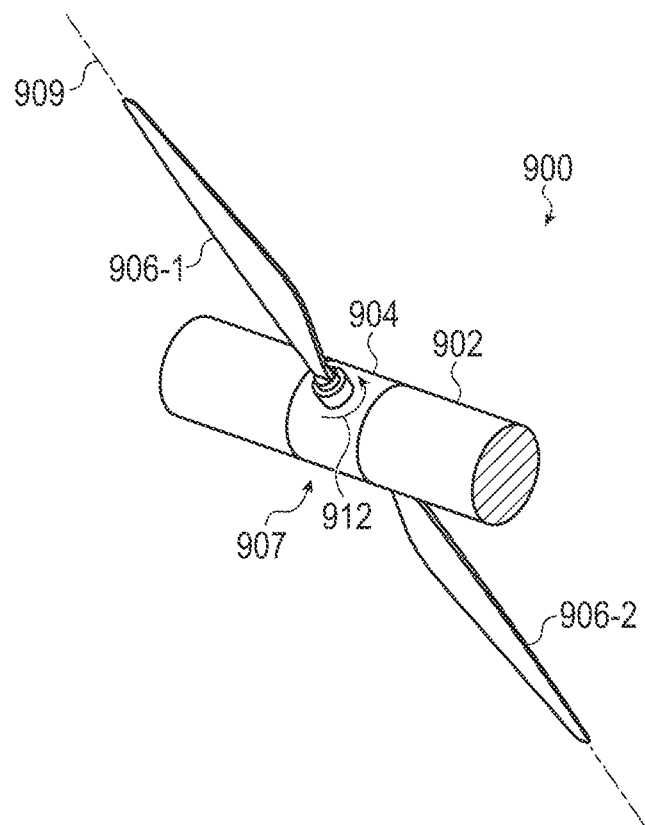
Figure 9C:
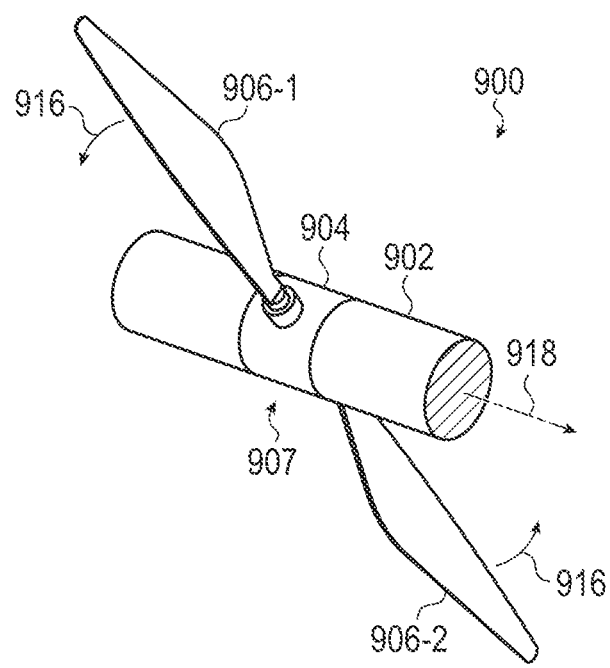

FIGS. 9A-9C illustrate a portion of an example propulsion system 900 that includes a rotor with reversible rotation and reversible collective blade angles. The propulsion system 900 may include a mounting shaft 902. The mounting shaft 902 may be structurally coupled to a body structure (e.g., a fuselage) of an aircraft, and may define a mounting structure for other components of the propulsion system (or other components of the aircraft more generally). In some cases, the mounting shaft 902 is a portion of another structure of an aircraft, such as a main strut or beam of a body structure. In some cases, the mounting shaft 902 is part of or is coupled to an articulatable tail section (e.g., the tail section 110). The propulsion system 900 may also include a rotor 907 coupled to the mounting shaft 902. The rotor 907 may include a rotor hub 904 and a set of rotor blades 906 (e.g., rotor blades 906-1, 906-2) extending from and/or coupled to the rotor hub 904. The rotor blades 906 may be asymmetrical, such that rotation in one direction produces a greater thrust (and/or lift, if the propulsion system is providing vertical lift as well as thrust) for a given rotational speed and blade angle than rotation in the opposite direction.

The propulsion system 900 may also include a motor coupled to the rotor and configured to rotate the rotor about its rotor axis. As used herein, the rotor axis refers to the axis of rotation of the rotor and/or rotor hub, about which the rotor and/or rotor hub rotates to produce thrust. Arrows 910 in FIG. 9A and 918 in FIG. 9C may correspond to the rotor axis of the rotor 907 (and represents rotor axes of other rotors and/or propulsion systems described herein). The motor may rotate the rotor 907 about the rotor axis in a first rotational direction in a first flight mode (e.g., a wing-borne flight mode) to produce thrust in a first thrust direction, and rotate the rotor 907 about the rotor axis in a second rotational direction opposite the first rotational direction in a second flight mode (e.g., a rotor-borne flight mode) to produce thrust in a second thrust direction opposite the first thrust direction. In FIGS. 9A-9C, the motor may be within or coupled to the rotor hub 904. Other example motors and motor integrations are shown and described with respect to FIGS. 10-14.

For ease of illustration and description, FIGS. 9A-13D illustrate single rotors with two rotor blades. The figures may be understood as illustrating a propulsion system having a single rotor, or as a single rotor of a multi-rotor propulsion system. For example, a propulsion system using at least one pair of counter-rotating rotors may use at least two of the rotors shown in FIGS. 9A-13D (modified as appropriate for counter-rotating operations). It will be understood that the same principles, structures, components, methods of operation, or other aspects described with respect to one rotor may apply equally to other rotors of propulsion systems with multiple rotors (e.g., two counter-rotating rotors). Further, propulsion systems with at least two rotors configured for counter-rotation may be used to control the roll of the aircraft, as described with respect to FIG. 5.

FIG. 9A illustrates the propulsion system 900 in a first flight mode, in which the propulsion system 900 is producing thrust in an aft-direction (as indicated by arrow 910). This flight mode may correspond to a rotor-borne flight mode, and may be used during VTOL operations, hover operations, or the like (e.g., the vertical take-off operation 402 in FIG. 4). As shown in FIG. 9A, the rotor 907 is rotating in a first rotational direction 908, and the rotor blades 906 are oriented at a first collective blade angle. The first collective blade angle may be configured to produce thrust in the aft-direction 910, and the value of the angle may be based on factors such as the shape of the rotor blades, a target rotor efficiency, a target rotor speed or speed range, or the like. As described herein, the collective blade angle of the rotor blades 906 during the first flight mode may be a fixed value (e.g., the collective blade angle may be fixed during the first flight mode).

FIG. 9B illustrates the propulsion system 900 during a transition operation in which the propulsion system 900 is transitioning from producing thrust in the first (aft) direction 910 to producing thrust in a forward direction 918 (as shown in FIG. 9C). As shown in FIG. 9B, the rotor blades 906 are rotating about a blade axis 909 (e.g., defined along a length and/or longitudinal axis of the rotor blades) from the first collective blade angle, shown in FIG. 9A, to the second collective blade angle, shown in FIG. 9C. As described herein, the rotation about the blade axis 909 may be produced by the same motor that rotates the rotor 907 about the rotor axis.

FIG. 9C illustrates the propulsion system 900 after transitioning to a forward thrust flight mode, such as may be used for wing-borne flight operations (e.g., the transition operation 404 and subsequent wing-borne flight). As shown, the rotor blades 906 have been oriented in a second collective blade angle. In some cases, the first collective blade angle differs from the second collective blade angle by 180 degrees (e.g., the rotor blades 906 are rotated 180 degrees about the blade axis 909 to transition from the first collective blade angle to the second collective blade angle). In FIG. 9C, the rotor is configured to rotate about the rotor axis in the second rotational direction 916 (e.g., opposite the first rotational direction 908). Because the collective blade angle of the rotor blades has also changed, the propulsion system may operate with the same or similar efficiency in the forward-thrust flight mode as in the reverse-thrust flight mode.

As described herein, the propulsion system may include a locking mechanism that locks the rotor blades in the first and second collective blade angles. The locking mechanism may prevent the collective blade angle of the rotor blades from changing during flight, thereby ensuring consistent rotor blade performance (e.g., consistent thrust for a given rotor speed).

Figure 10:
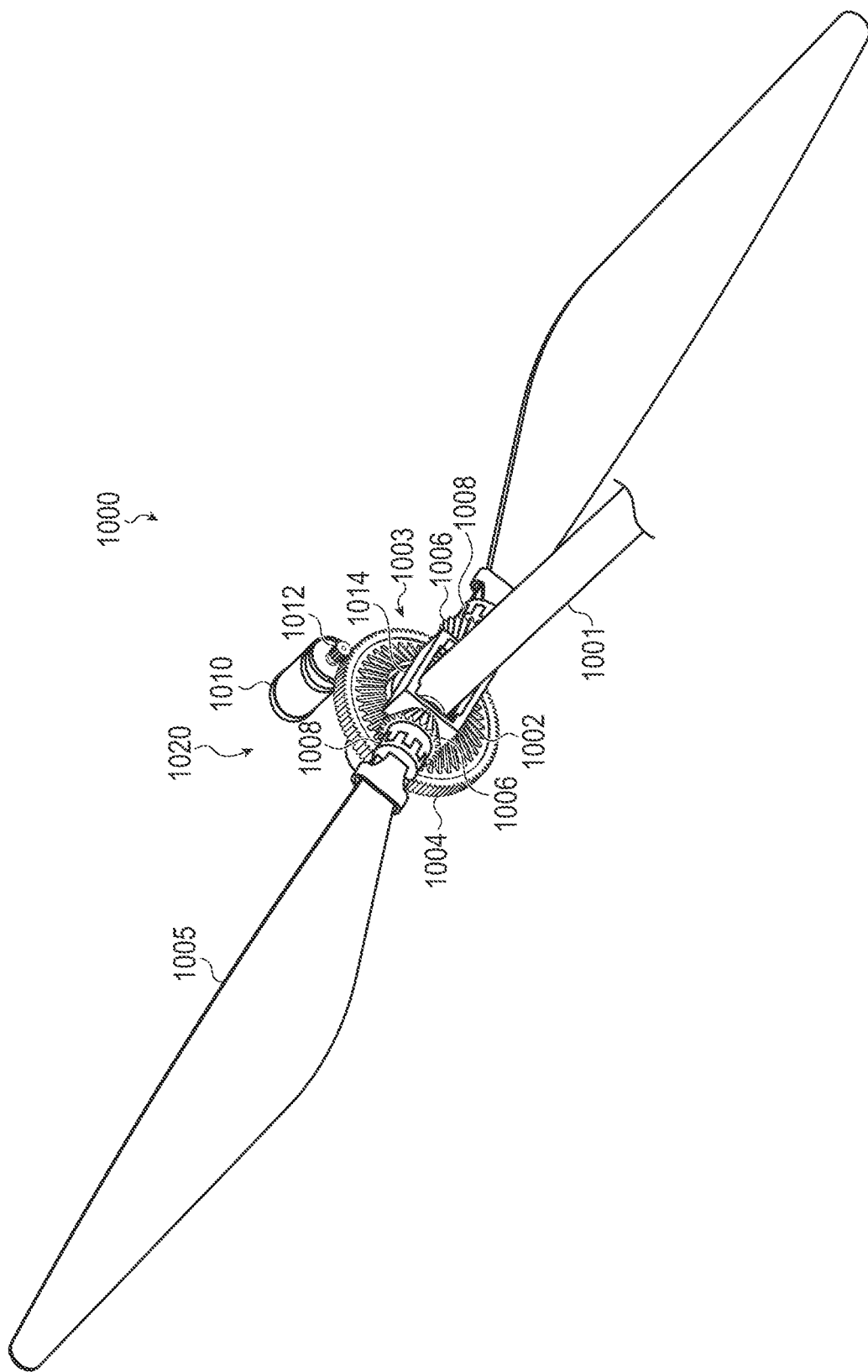
FIG. 10 illustrates an example propulsion system with a variable collective blade angle.

FIG. 10 illustrates a portion of an example propulsion system 1000, which may correspond to or be an embodiment of the propulsion system 900. It will be understood that the description of the propulsion system 900 may apply equally or by analogy to the propulsion system 1000 (and other propulsion system embodiments described herein). The propulsion system 1000 includes a single rotor 1020 having two rotor blades 1005, though a propulsion system may include more rotors 1020 (e.g., at least one additional counter-rotating rotor), and the rotors 1020 may include more rotor blades (e.g., three, four, five, or more rotor blades). The rotor blades 1005 may be orientable in a first locked orientation corresponding to a first collective blade angle, and in a second locked orientation corresponding to a second collective blade angle, as described herein.

The propulsion system 1000 includes a mounting shaft 1001 (which may correspond to and/or be an embodiment of the mounting shaft 902). A rotor hub 1014 (which may correspond to and/or be an embodiment of the rotor hub 904) may be coupled to the mounting shaft 1001. In some cases, the rotor hub 1014 is coupled to the mounting shaft 1001 by bearings or bushings (e.g., to facilitate smooth rotation of the rotor hub 1014 and maintain alignment of the rotor hub 1014 on the mounting shaft 1001).

The rotor 1020 includes a drive gear 1003, which may be coupled to the mounting shaft 1001. The drive gear 1003 may be coupled to the mounting shaft by bearings or bushings. The drive gear 1003 may include a ring gear portion 1004 configured to engage with a pinion gear 1012 of a motor 1010. The motor 1010 may rotate the pinion gear 1012 to rotate the drive gear 1003 in order to both rotate the rotor for propulsion, and, as described herein, change the collective blade angle of the rotor blades.

The drive gear 1003 may include a bevel gear portion 1002 that is configured to engage rotor gears 1006 that are coupled to the rotor blades 1005. As described herein, the engagement between the bevel gear portion 1002 and the rotor gears 1006 provides the force for both rotating the rotor about the rotor axis and rotating the rotor blades about the blade axis (for changing the collective blade angle of the rotor blades). Further, the drive gear 1003 may be rotationally free from the rotor hub 1014, except through the engagement between the bevel gear portion 1002 and the rotor gears 1006. Thus, as described herein, the drive gear 1003 may rotate relative to the rotor hub 1014 during an operation to change the collective blade angle of the rotor blades, and it may not rotate relative to the rotor gears 1006 during thrust-producing operations. For ease of reference, the portion of the drive gear 1003 that engages the rotor gears 1006 is shown and described as a bevel gear, though this is merely one example implementation, and other types of gears or engagement mechanisms may be used instead of or in addition to bevel gears, including spur gears, helical gears, worm gears, spiral gears, hypoid gears, pins and recesses, or the like.

The rotor 1020 also includes variable-engagement couplings 1008 that couple the rotor blades 1005 to the rotor hub 1014. As described herein, the variable-engagement couplings 1008 allow the rotor blades 1005 to move radially inward and outward (e.g., along the rotor axis) during certain operations to facilitate the locking and unlocking of the rotor blades for collective blade angle adjustments. The variable-engagement couplings 1008 may be jaw couplings, finger couplings, or any other suitable coupling that transfers rotational forces to the rotor blades (e.g., for rotating the rotor blades about the blade axis to change the collective blade angle) while also allowing the rotor blades to move radially towards and away from the rotor hub 1014.

Figure 11A:
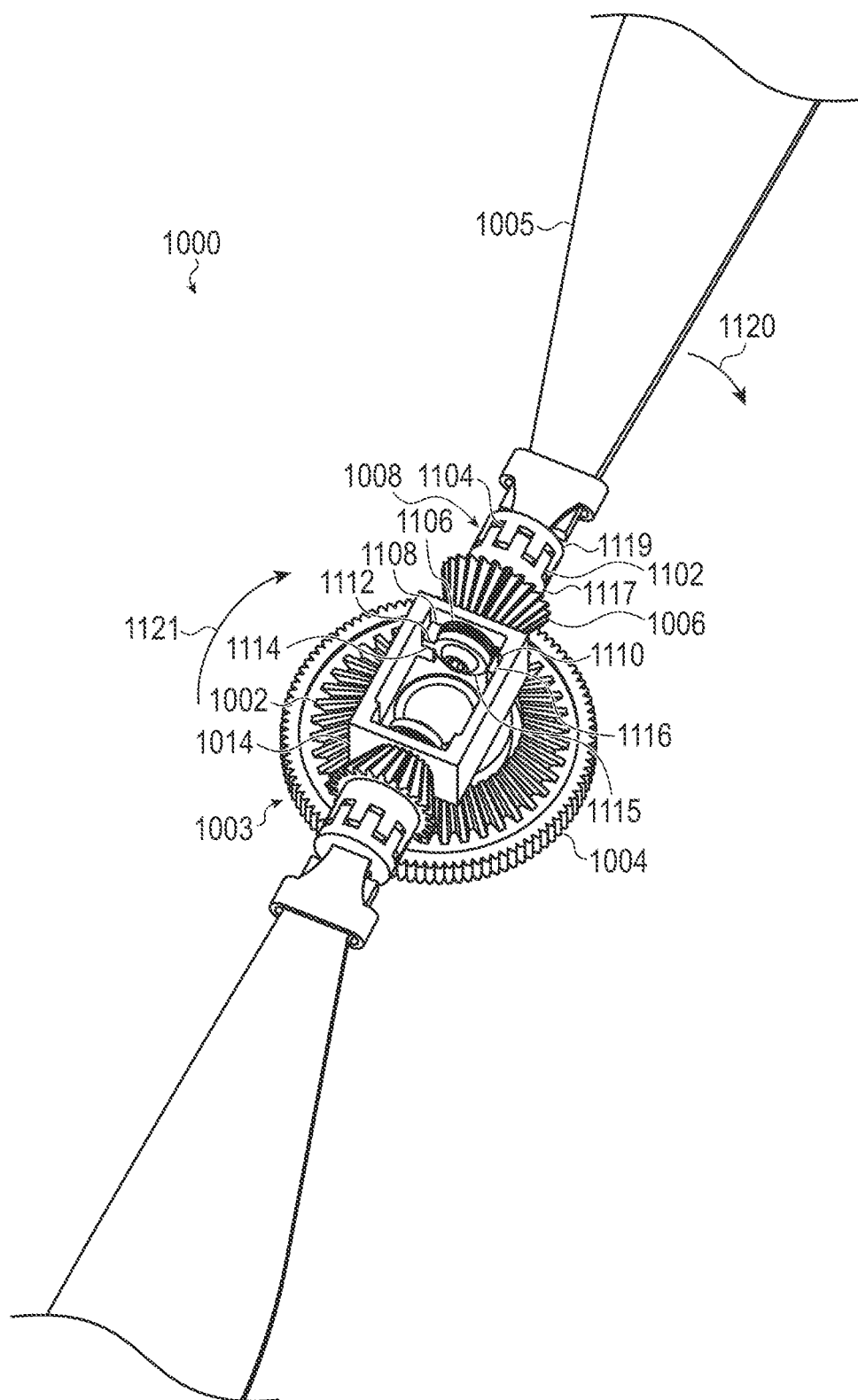
FIGS. 11A-11G illustrate an example rotor at various stages of an operation to change a collective blade angle.
Figure 11B:
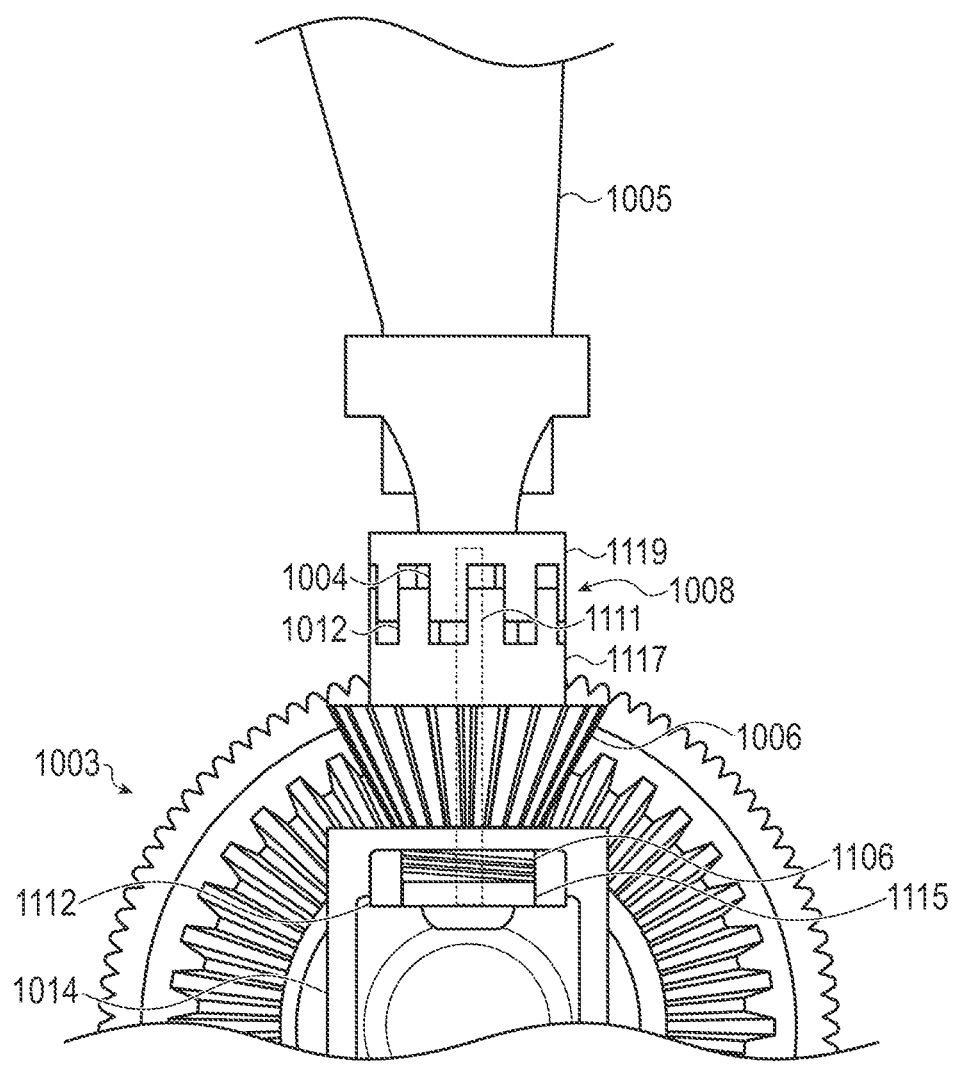
Figure 11C:
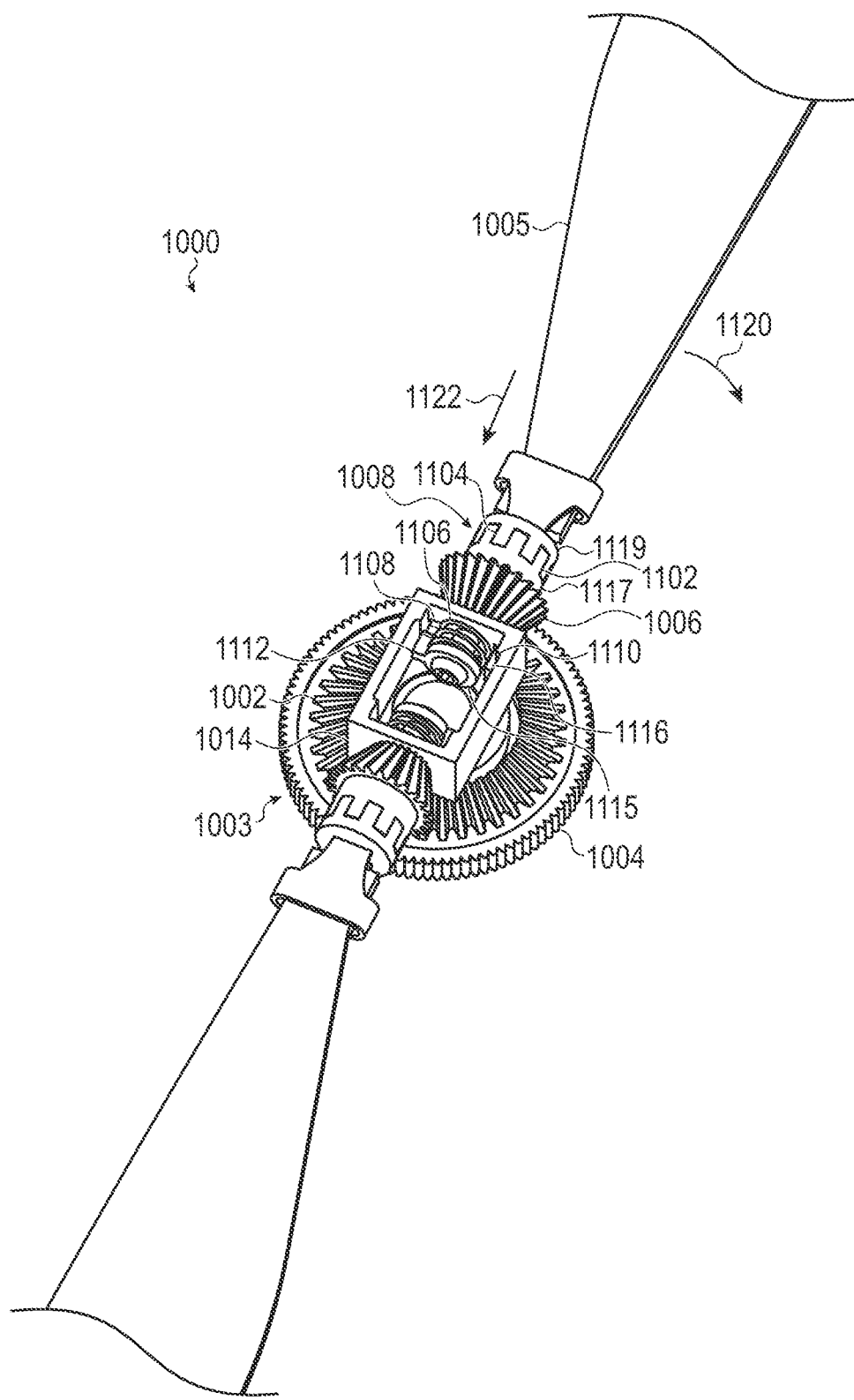
Figure 11D:
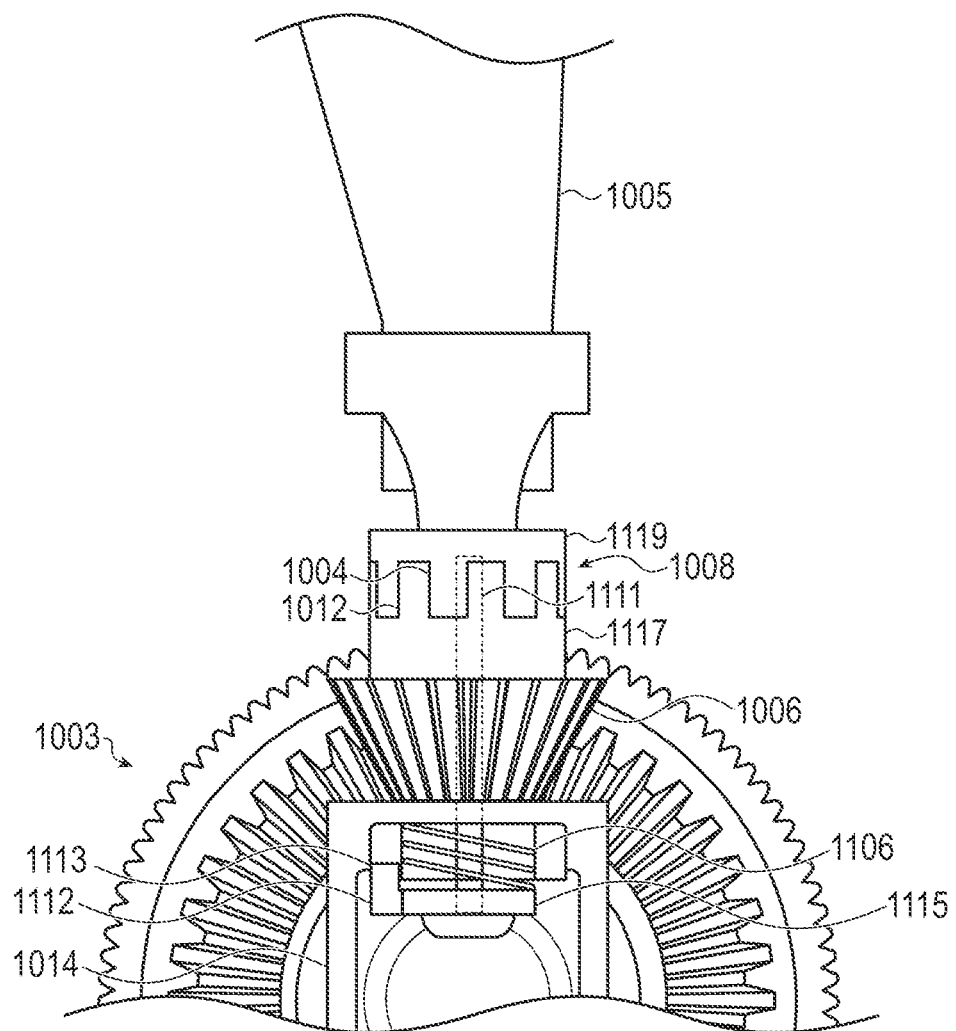

The variable-engagement couplings 1008 may include a first engagement member 1117 and a second engagement member 1119 (as shown in FIG. 11A). The first engagement member 1117 may be coupled to the rotor gear 1006. In some cases, the rotor gear 1006 and the first engagement member 1117 are a single unitary component (e.g., a single, monolithic piece of material, such as metal). The second engagement member 1119 may be coupled to (or integrally formed with) the rotor blade 1005. The first and second engagement members 1117, 1119 may define or include fingers 1102, 1104 (respectively) that overlap and/or engage one another. The fingers 1102, 1104 may be configured with substantially no rotational play, such that rotational forces and/or tangential forces imparted to the rotor gear 1006 from the drive gear 1003 (e.g., the bevel gear portion 1002 of the drive gear 1003) are transferred directly to the rotor blade 1005. The fingers 1102, 1104 may move axially relative to one another, such that the rotor blade 1005 can translate radially (e.g., along the blade axis). For example, as described herein, FIGS. 11A and 11B illustrate the first and second engagement members 1117, 1119 in a first engagement position, in which the fingers 1102, 1104 overlap a first amount, and FIGS. 11C and 11D illustrate the first and second engagement members 1117, 1119 in a second engagement position, in which the fingers 1102, 1104 overlap a second amount greater than the first amount. In both engagement positions, rotational and/or tangential forces imparted to the rotor gear 1006 are transferred directly to the rotor blade 1005. Stated another way, the rotor blade 1005 and the rotor gear 1006 are effectively rotationally fixed relative to one another, while also allowing a limited amount of relative axial movement.

The rotor 1020 also includes a locking mechanism that is configured to lock the rotor blades at the first collective blade angle during the first flight mode and lock the rotor blades at the second collective blade angle during the second flight mode. The locking mechanism may also be configured to unlock the rotor blades during a transition from the first flight mode to the second flight mode to allow the rotor blades to move from the first collective blade angle to the second collective blade angle. FIGS. 11A-11G illustrate how the various components of the propulsion system 1000 of FIG. 10 cooperate to rotate the rotor blades while in a locked state to provide propulsion, cause the rotor blades to unlock during a transition between flight modes, and cause the rotor blades to change their collective blade angle during the transition.

FIGS. 11A and 11B illustrate the propulsion system 1000 when the rotor is rotating in a first rotational direction (indicated by arrow 1120), and the rotor blades are locked at a first collective blade angle. In this state, the rotor gears 1006 are fixed relative to the rotor hub 1014 by a locking mechanism as described herein. Accordingly, rotation of the drive gear 1003 when the rotor gears 1006 are fixed relative to the rotor hub 1014 causes rotation of the rotor hub about the rotor axis. When the rotor gears 1006 are unlocked (as described with respect to FIGS. 11C-11F), the rotor gears 1006 may be rotatable relative to the rotor hub 1014, such that rotation of the drive gear 1003 causes the rotor gears 1006 to rotate, relative to the rotor hub 1014, to change the collective blade angle of the rotor blades.

The rotor blades are locked at the first collective blade angle via a locking mechanism in which centrifugal force acting on the rotor blades (due to the rotation of the rotor about the rotor axis) causes the locking mechanism to engage and prevent rotation of the rotor blades about the blade axis. For example, the centrifugal force acting on the rotor blades 1005 due to the rotor rotation causes the rotor blades 1005 to move radially outward, which causes a locking wheel 1115 to be forced into engagement with a locking feature (e.g., a locking feature 1108, 1110) of the hub 1014, thereby locking the rotor blades at the first collective blade angle. Locking mechanisms (or portions of locking mechanisms) in which changes to the centrifugal force on a rotor blade result in the locking mechanism transitioning between locked and unlocked states may be referred to as centrifugal locking mechanisms.

As shown in FIG. 11B, the rotor blade 1005 may be coupled to the locking wheel 1115 via a coupling structure 1111 (e.g., a shaft, bolt, rod, or other structure) that extends through the drive gear 1003 and couples to the rotor blade and/or the second engagement member 1119. A biasing mechanism 1106 may impart a biasing force on the locking wheel 1115 to bias the locking wheel towards a disengaged or unlocked state. As shown in FIGS. 11A and 11B, the centrifugal force acting on the rotor blades 1005 results in the rotor blades 1005 overcoming the biasing force of the biasing mechanism 1106 to force the locking wheel 1115 into engagement with a corresponding locking feature on the rotor hub 1014 (or other suitable structure of the rotor 1020). For example, the centrifugal force on the rotor blade 1005 may result in the second engagement member 1119 translating axially away from the first engagement member 1117 (while maintaining overlap and/or engagement between the fingers 1102, 1104), such that the biasing mechanism 1106 is overcome (e.g., compressed) and the locking wheel 1115 is forced into engagement with a locking feature (e.g., the locking feature 1108).

The biasing mechanism 1106 may be a compliant material, member, or assembly. As nonlimiting examples, the biasing mechanism 1106 may be a spring (e.g., a coil spring, Belleville spring or disc spring, spring washers, leaf springs, etc.), a compliant material (e.g., an elastomer bushing, compliant polymer, etc.), a compliant assembly (e.g., a fluid-filled compliant bladder), or the like. The biasing mechanism 1106 may be positioned between the locking wheel 1115 and a surface of the rotor hub 1014, as shown, or in another location (e.g., within the rotor hub 1014 and proximate a distal end of the coupling structure 1111).

The biasing force of the biasing mechanism 1106 may be overcome by the centrifugal force on the rotor blade 1005 when the rotor is rotating above a threshold rotational speed. In particular, as the rotor rotates, the centrifugal force acting on the rotor blades 1005 increases as a function of rotational speed of the rotor. The biasing mechanism 1106 may be configured so that the biasing force is overcome by the centrifugal force (resulting in the locking wheel 1115 locking the rotor blades) when the rotor is rotating at a threshold speed (or speed range). In some cases, the threshold speed is about 500 revolutions per minute ("RPM"), about 1000 RPM, about 2000 RPM, about 3000 RPM, or another suitable value.

As noted above, the locking mechanism that locks the rotor blades at a collective blade angle may include a locking wheel 1115 and one or more locking features (e.g., formed from and/or coupled to the rotor hub 1014) that engages the locking wheel 1115. In the example shown in FIG. 11A, the locking wheel 1115 includes a tab 1112 (e.g., a locking tab) and the rotor hub 1014 includes first and second locking features 1108, 1110, which are recesses formed in the rotor hub 1014. In other examples, the locking features are protrusions, tabs, slots, or other features or components that are configured to contact, interfere with, or otherwise engage the tab 1112 of the locking wheel 1115 to lock the rotor blade 1005 at a collective blade angle. As shown in FIGS. 11A and 11B, the tab 1112 (e.g., a locking portion 1113 of the tab 1112, visible in FIG. 11D) is positioned at least partially in a recess (e.g., the locking feature 1108), thus preventing rotation of the locking wheel 1115 and locking the rotor blade 1005 at a first collective blade angle.

The rotor 1020 may also include rotation-limiting features that are configured to engage the locking wheel 1115 to position the rotor blades at target collective blade angles. For example, the rotor may include rotation-limiting features 1114, 1116 that overlap the tab 1112 of the locking wheel 1115 and prevent rotation of the locking wheel 1115 (and thus the rotor blades) about the bade axes past a certain location. When the rotor blades are rotated about their blade axes during a thrust reversal operation, as described herein, locking wheels may engage the rotation-limiting features to prevent rotation of the rotor blades past the target collective blade angle. In one example, the rotation-limiting features are shoulder features of the rotor hub 1014. In other examples, the rotation-limiting features may be any suitable feature that engages the locking wheel 1115 (or another component of the rotor) to prevent rotation past a certain blade angle. Other example rotation-limiting features include pins, posts, latches, or the like. Rotation-limiting features may be fixed (e.g., features formed from a unitary structure or member, such as the rotor hub 1014) or they may be adjustable (e.g., a threaded fastener or set screw that can be adjusted manually or via an actuator, during flight or otherwise).

As described herein, the rotor blades can be reoriented from a first collective blade angle to a second collective blade angle as part of a thrust reversal operation. This operation may be performed by reversing the direction of rotation of the motor 1010. In particular, the operation of reversing the rotation direction of the motor (including decelerating from a current rotational speed) can unlock the rotor blades, rotate the rotor blades about their blade axes to orient them in the second collective blade angle, and re-lock the rotor blades at the second collective blade angle. FIGS. 11A-11G illustrate the propulsion system at various stages of the reorientation operation.

As described above, FIGS. 11A and 11B illustrate the rotor 1020 with the rotor blades 1005 oriented at a first collective blade angle and in a locked position. This configuration may result from the motor rotating the drive gear 1003 in a first rotational direction, indicated by arrow 1121, resulting in the rotor blades 1005 rotating in the first rotational direction, indicated by arrow 1120. As described herein, a pinion gear 1012 attached to the motor 1010 may engage the ring gear portion 1004 of the drive gear 1003 to rotate the rotor in the first direction. Further, the configuration shown in FIGS. 11A and 11B corresponds to the rotor rotating above a first threshold speed in the first rotational direction, resulting in the locking wheel 1115 engaging the first rotation-limiting feature 1114 and the locking feature 1108. Further, as shown in FIG. 11B, the biasing mechanism 1106 is collapsed, and the first and second engagement members 1117 and 1119 of the variable-engagement couplings are partially separated. Thus, the rotor blades are oriented and locked at the first collective blade angle, and maintained in that orientation due to the centrifugal force acting on the rotor blades.

During a thrust reversal operation, the rotor may begin to decelerate towards zero RPM as it prepares to reverse the rotational direction of the motor and rotor. FIGS. 11C and 11D illustrate the rotor when it is rotating below the first threshold speed in the first direction, as indicated by arrow 1120 in FIG. 11C. As shown in FIGS. 11C and 11D, when the rotational speed drops below the first threshold speed, the biasing force from the biasing mechanism 1106 overcomes the centrifugal force acting on the rotor blades 1005 (which reduces as the rotational speed reduces), thus causing the rotor blades 1005 to translate along their blade axes towards the rotor hubs (as indicated by arrow 1122 in FIG. 11C) and causing the locking wheel 1115 to disengage from the first locking feature 1108. Further, the first and second engagement members 1117 and 1119 of the variable-engagement couplings overlap to a greater extent as compared to FIGS. 11A and 11B. At this point, the rotor blades 1005 are unlocked and are free to rotate, about their blade axes, from the first collective blade angle to the second collective blade angle. The rotor blades 1005 may remain at the first collective blade angle in the unlocked configuration until the motor changes rotation direction and begins rotating in the second direction, as described herein. In some cases, the rotor blades 1005 may rotate some amount about their blade axes even while they are still rotating in the first rotation direction, depending on factors such as the rate of deceleration (e.g., the rate of change of the rotational speed), the aerodynamic drag on the rotor blades 1005, a net amount of torque applied by the drive gear 1003 on the rotor gears 1006, and the like.

Figure 11E:
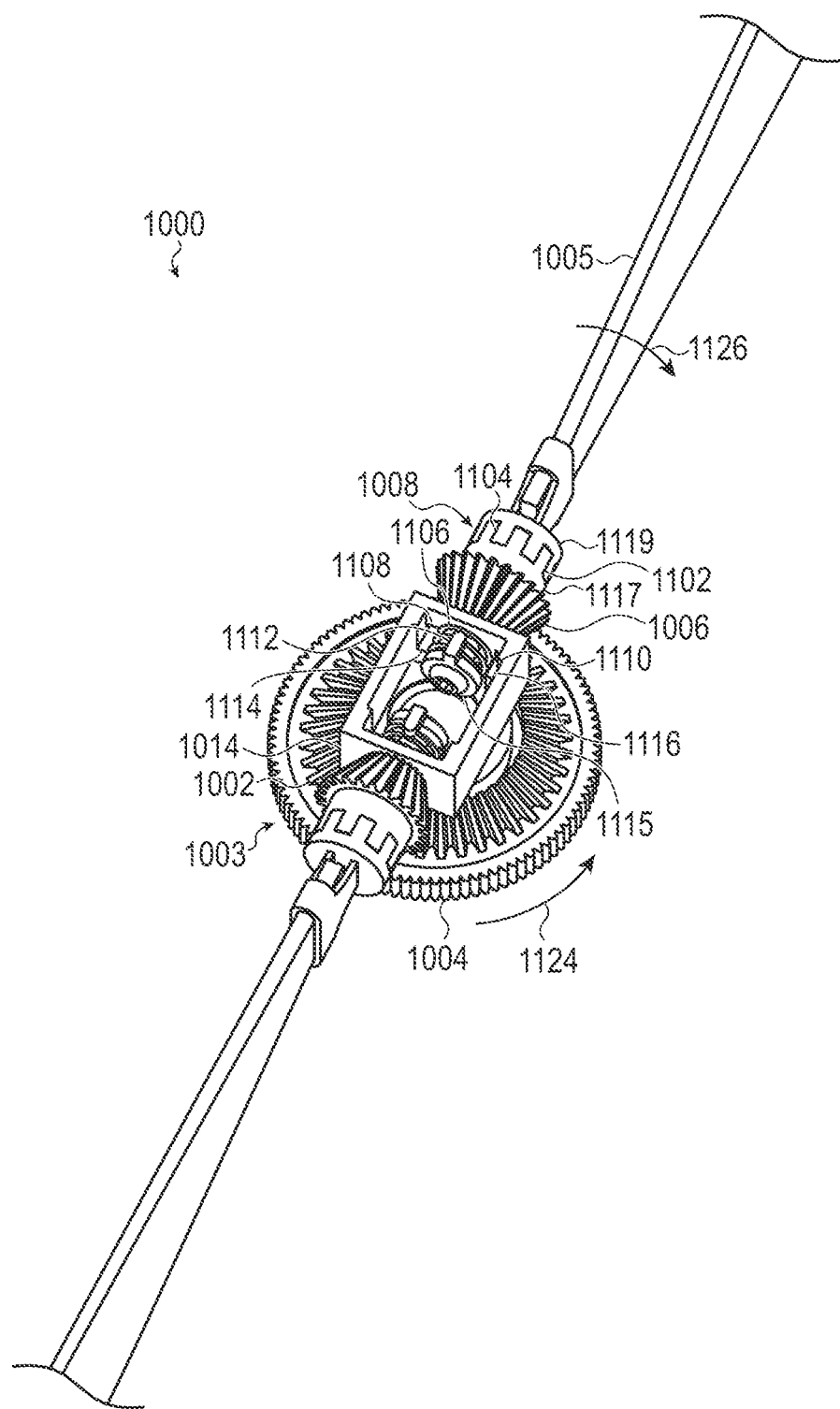

Once the rotor blades 1005 are unlocked, they are free to rotate about their blade axes. In some cases, despite the rotor blades 1005 being unlocked, they may remain at the first collective blade angle (e.g., with the locking wheel 1115 engaging the first rotation-limiting feature 1114) until the motor reverses rotation direction. FIG. 11E illustrates the rotor 1020 at mid-rotation. As shown, the motor has changed rotation direction as compared to FIGS. 11A-11D, resulting in the drive gear 1003 rotating in the direction indicated by arrow 1124 (the opposite direction from that shown in FIG. 11A).

Figure 11F:
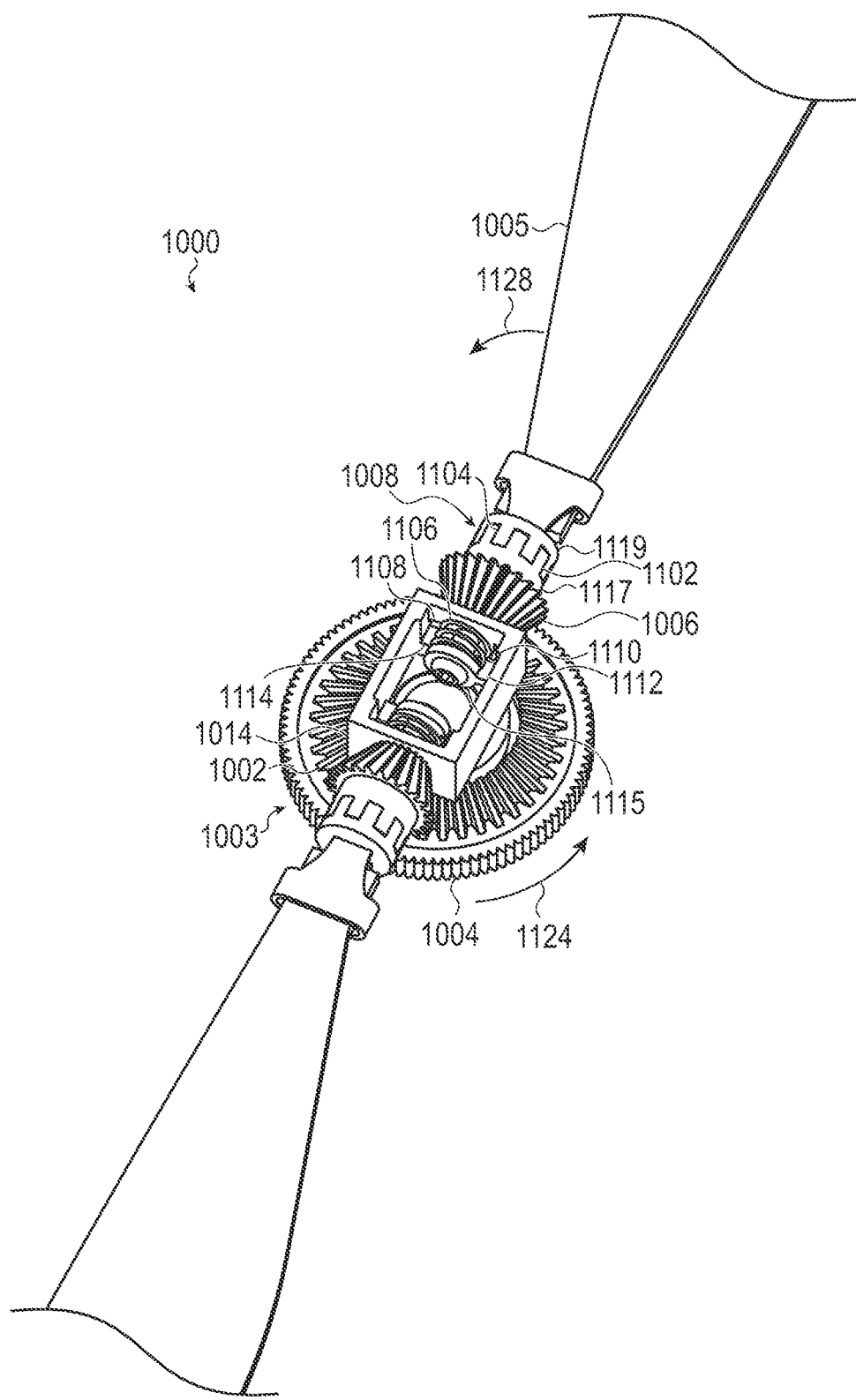

The rotation of the drive gear 1003 while the rotor blades are unlocked results in the rotor blades rotating about their blade axes, until ultimately the locking wheel 1115 contacts or otherwise engages the second rotation-limiting feature 1116, which sets the rotor blades at the second collective blade angle, as shown in FIG. 11F. In this state, the rotor blades have been fully rotated about their blade axes and are oriented at the second collective blade angle (due to the locking wheel 1115 engaging the second rotation-limiting feature 1116), but the rotor has not yet reached the second threshold rotational speed in the second rotational direction (e.g., in the direction indicated by arrow 1128 in FIG. 11F). Accordingly, the locking wheel 1115 is unlocked (e.g., not engaged with the locking feature 1110 of the rotor hub), and the variable-engagement couplings 1008 may be overlapping to their fullest extent.

Figure 11G:
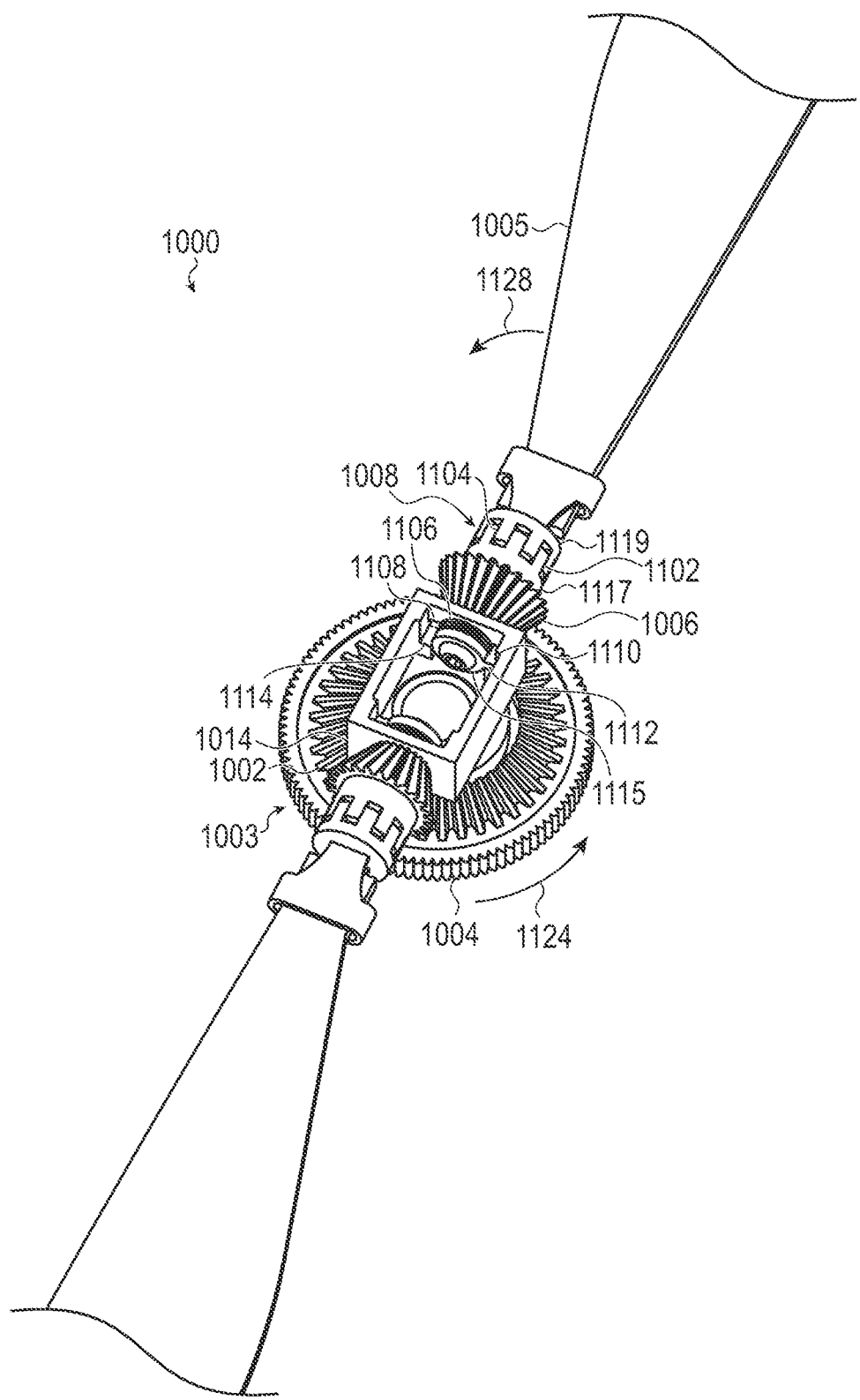

As the rotor increases its rotational speed in the second rotational direction to and past the second threshold rotational speed, the centrifugal force on the rotor blades 1005 overcomes the biasing force of the biasing mechanism 1106, thereby causing the locking wheel 1115 to engage the second locking feature 1110, thereby locking the rotor blades at the second collective blade angle. FIG. 11G illustrates the rotor in the locked condition, with the rotor rotating in the second rotational direction (arrow 1128), resulting from the motor driving the drive gear 1003 in the direction indicated by arrow 1124.

The operation of changing the collective blade angle by rotating the blades about their blade axes may occur when the rotor is at about zero RPM (e.g., where the rotational speed crosses zero during a rotation direction reversal). In some cases, the rotor blades rotate about their axes while the rotational speed of the rotor is zero, as the force from the motor 1010 rotating the drive gear 1003 primarily or exclusively results in rotation of the rotor gears 1006, rather than rotation of the rotor. In other cases, the rotor may rotate about the rotor axis while the blades are rotating about their blade axes (e.g., there may be incidental rotor rotation while the collective blade angle of the rotor blades is being reversed). Regardless, the changing of the collective blade angle may occur entirely between the first and second threshold speeds (e.g., below about 1000 RPM in the first direction and below about 1000 RPM in the second direction, or, equivalently, between about 1000 RPM and about −1000 RPM). In some cases, the collective blade angle does not begin to change until the motor reverses rotational direction, and the entire blade rotation occurs while the rotor is either not rotating or is rotating in the second direction.

While FIGS. 10-11G illustrate the drive gear being driven by a geared coupling to a motor, this is merely one example configuration for a motor to provide rotational force to the drive gear 1003. In some cases, a direct-drive or shaft-mounted motor is used, in which the drive gear 1003 is coupled directly to a rotating portion of a motor, thereby eliminating the geared interface between the drive gear 1003 and the motor 1010 (and optionally allowing use of a drive gear that lacks the ring gear portion 1004). FIGS. 12A-13D illustrate example rotors with motors that directly couple to the drive gears. Such motors may be used in the rotor shown and described with respect to FIGS. 10-11G.

FIGS. 10-11G illustrate an example rotor that is configured to change propulsion direction by changing both the direction of rotation of the rotor (about the rotor axis) and by changing the collective blade angle of the blades (by rotating the blades about a blade axis). Moreover, a single motor can change the collective blade angle simply via the operation of changing the rotation direction of the rotor. However, this is merely one example implementation of a rotor that can perform these functions. FIGS. 12A-13D illustrates other example rotors in which the collective blade angle of the rotors can be changed (e.g., reversed) incidental to the change in rotation direction of the rotor.

Figure 12A:
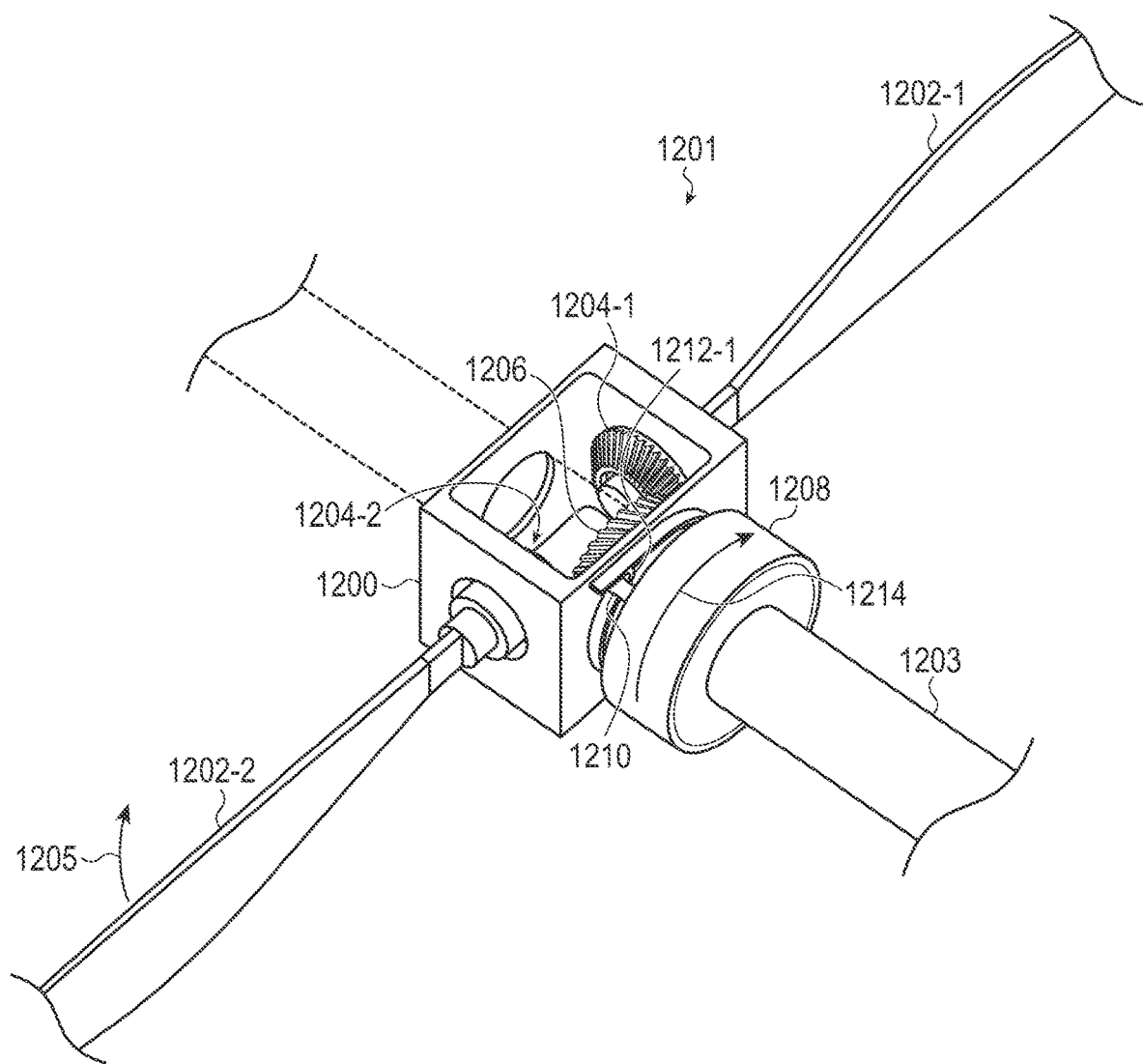
FIGS. 12A-12B illustrate another example rotor with a variable collective blade angle.

FIG. 12A illustrates an example rotor 1201 that includes rotor blades 1202 (1202-1, 1202-2), a rotor hub 1200, and a motor 1208. The motor may be coupled to a drive gear 1206, which engages rotor gears 1204 (1204-1, 1204-2) on each rotor blade to provide force for rotating the rotor blades 1202 about their blade axes (e.g., to change the collective blade angle). The rotor blades 1202 may be rotatable (about their blade axes) relative to the rotor hub 1200, and the rotor hub 1200 may be rotatable on a mounting shaft 1203, which couples the rotor to a body structure (or other structure of an aircraft. The motor 1208 may be mounted on the mounting shaft 1203, and may have a static portion that is rotationally fixed to the mounting shaft 1203 and a rotating portion that is coupled to the drive gear 1206 and is rotatable relative to the static portion of the motor and the mounting shaft 1203. The rotating portion of the motor 1208 may also rotate relative to the rotor hub 1200, such as during a collective blade angle change operation as described herein.

The rotor 1201 may include a rotation-limiting mechanism that defines the collective blade angle of the rotor blades for two different rotor rotational directions (and thus two different thrust directions). For example, the rotation-limiting mechanism may include a dynamic rotation-limiting feature 1210 that engages (e.g., contacts) static rotation-limiting features 1212 when the motor is rotating in order to fix the collective blade angle and cause the motor rotations to spin the rotor hub 1200 (and thus the rotor blades 1202). As shown in the example of FIGS. 12A-12B, the dynamic rotation-limiting feature 1210 is a protrusion extending from the rotating portion of the motor 1208, and the static rotation-limiting features 1212 are wall features of the rotor hub 1200 (e.g., machined into the material of the rotor hub 1200, coupled to the rotor hub 1200, or the like).

As shown in FIG. 12A, when the motor is rotating in a first direction, indicated by arrow 1214, the dynamic rotation-limiting feature 1210 engages (e.g., is forced into contact with) one of the static rotation-limiting features 1212. In this state, force from the motor rotating in the first direction is transferred to the rotor hub 1200 via the engagement between the dynamic and static rotation-limiting features 1210, 1212. In particular, rotation of the motor 1208 in the first rotational direction 1214 causes the dynamic rotation-limiting feature 1210 to push against a first static rotation-limiting feature 1212-1, thereby causing the rotor hub 1200 (and thus rotor blades) to rotate about the rotor axis in the first direction 1205.

Figure 12B:
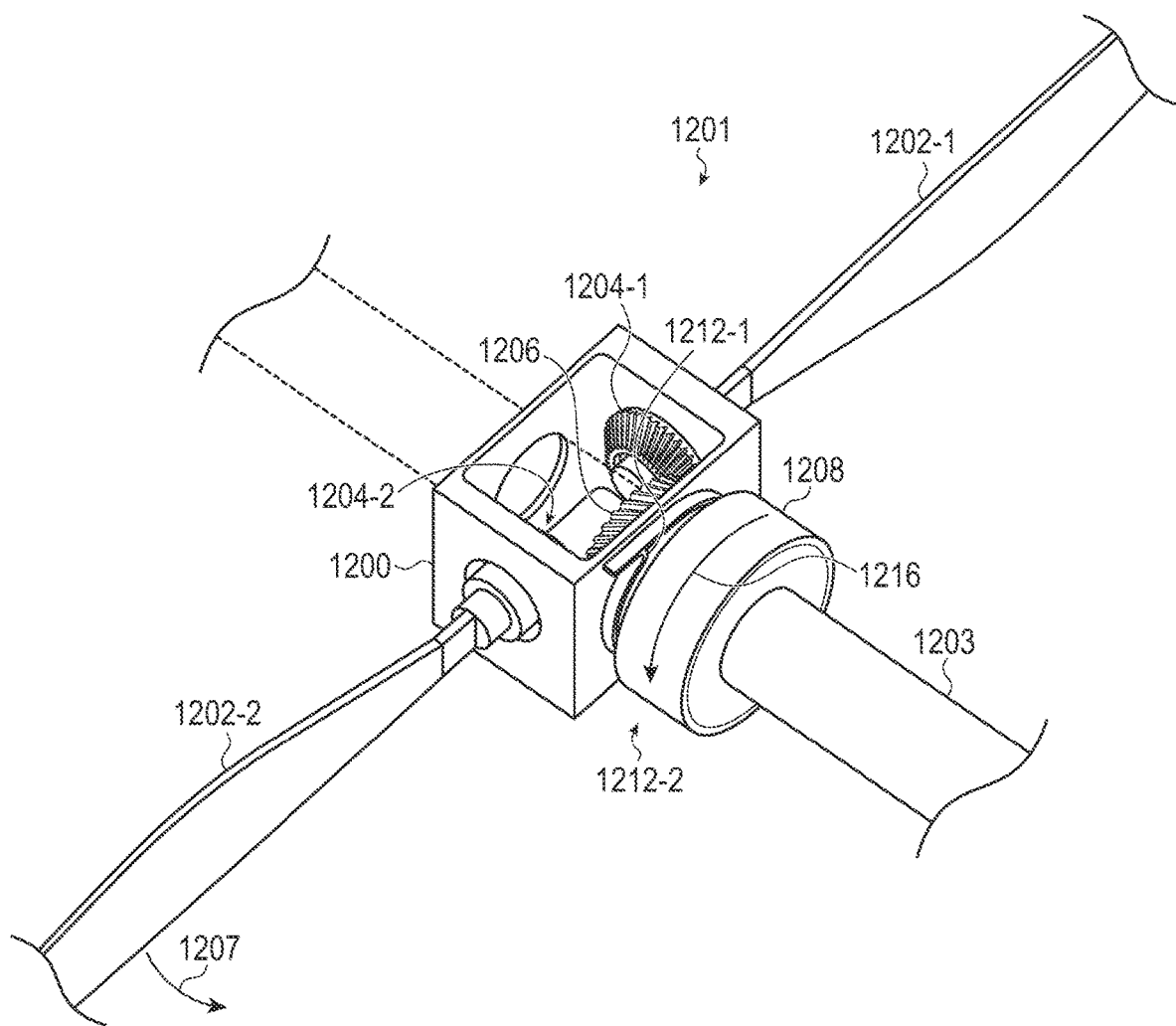

When the motor 1208 reverses its rotational direction, such as to change from producing thrust in a forward direction to producing thrust in an aft or rearward direction, the dynamic rotation-limiting feature 1210 disengages the first static rotation-limiting feature 1212-1, allowing the rotating portion of the motor 1208 to rotate the drive gear 1206 relative to the rotor hub 1200 in a second rotational direction (opposite the first rotational direction 1214), indicated by arrow 1216 in FIG. 12B. Because the drive gear 1206 is engaged with the rotor gears 1204, the rotation of the drive gear 1206 due to the reversal of the motor direction causes the rotor blades to rotate about their blade axes, thereby changing the collective blade angle. Once the dynamic rotation-limiting feature 1210 engages the second static rotation-limiting feature 1212-2 (which may be 180 degrees from the first static rotation-limiting feature 1212-1), the drive gear 1206 is prevented from further rotation relative to the rotor hub 1200. Accordingly, the rotor blades cease rotating about their blade axes, the rotor blades are oriented at the second collective blade angle (as defined and/or maintained by the contact between the dynamic rotation-limiting feature 1210 and the second static rotation-limiting feature 1212-2), and further rotation of the motor 1208 in the second direction 1216 results in rotation of the rotor hub 1200 and rotor blades 1202 about the rotor axis in the second rotational direction 1207.

Figure 13B:
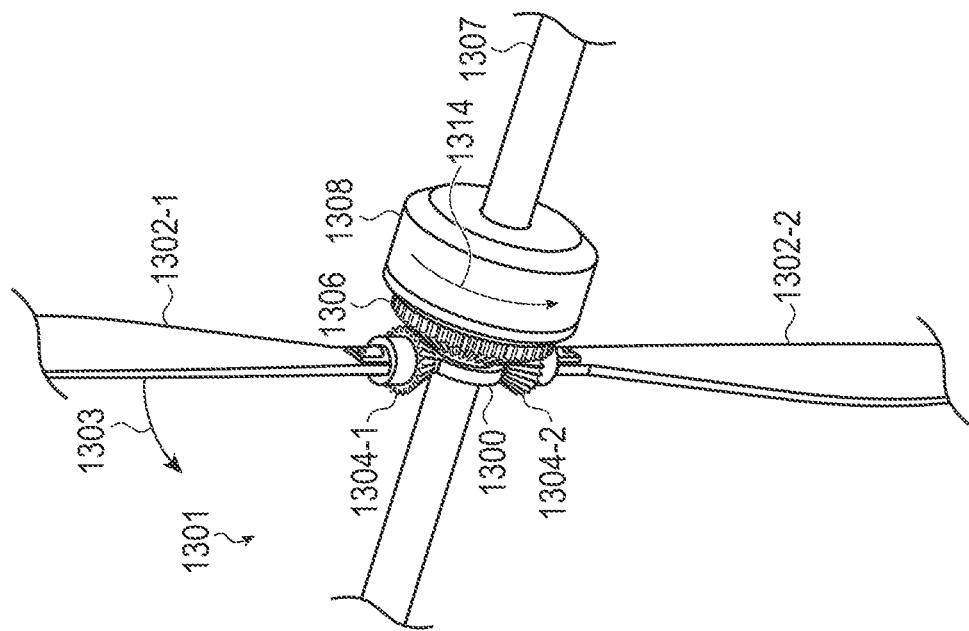
Figure 13A:
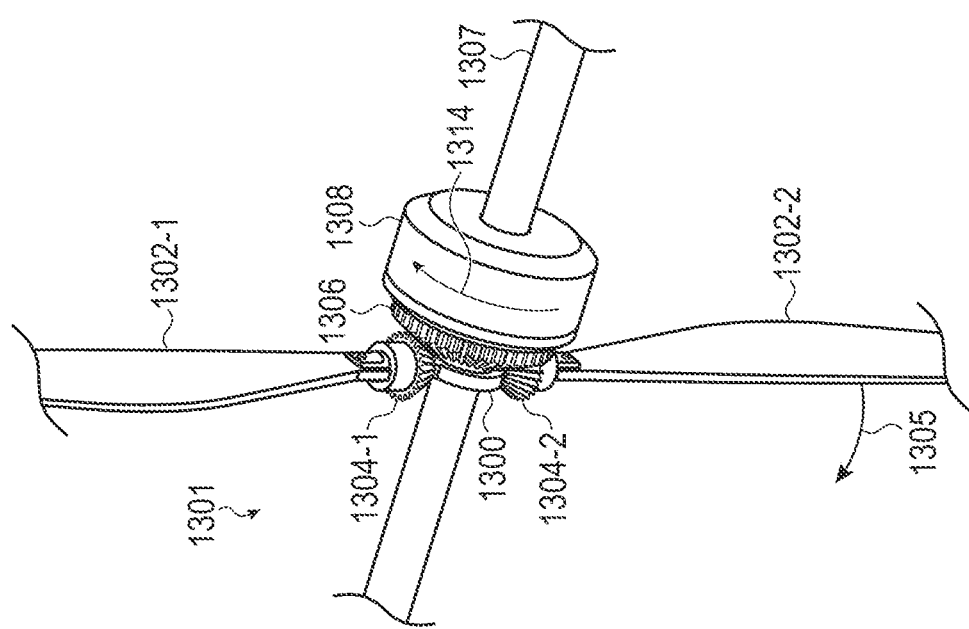

FIG. 13A illustrates an example rotor 1301 that includes rotor blades 1302 (1302-1, 1302-2), a rotor hub 1300, and a motor 1308. The motor may be coupled to a drive gear 1306, which engages rotor gears 1304 (1304-1, 1304-2) on each rotor blade to provide force for both rotating the rotor hub (and thus the rotor blades) about the rotor axis, and for rotating the rotor blades 1302 about their blade axes (e.g., to change the collective blade angle). The rotor blades 1302 may be rotatable (about their blade axes) relative to the rotor hub 1300, and the rotor hub 1300 may be rotatable on a mounting shaft 1307, which couples the rotor to a body structure (or other structure of an aircraft. The motor 1308 may be mounted on the mounting shaft 1307, and may have a static portion that is rotationally fixed to the mounting shaft 1307 and a rotating portion that is coupled to the drive gear 1306 and is rotatable relative to the static portion of the motor and the mounting shaft 1307. The rotating portion of the motor 1308 may also rotate relative to the rotor hub 1300, such as during a collective blade angle change operation as described herein. The rotor gears 1304 may also be rotatable (about the blade axes) relative to the rotor hub 1300, as described herein, and may include or be part of a rotation-limiting system that defines at least two different collective blade angles and facilitates the transition from a first collective blade angle to a second collective blade angle when the motor 1308 changes rotational directions.

FIG. 13C illustrates an exploded view of a portion of the rotor, illustrating rotation-limiting features that limit rotation of the rotor blades about the blade axes and ultimately establish the collective blade angles for the rotor blades in the different rotor directions. In particular, the rotor hub 1300 may include or define a sleeve portion 1320. A blade coupling member 1322 may be positioned in the sleeve portion 1320, and may be coupled to a rotor blade (e.g., at the top portion of the blade coupling member 1322, as oriented in FIG. 13C). The blade coupling member 1322 may be movable within the sleeve portion 1320. For example, the blade coupling member 1322 may be rotatable and translatable within the sleeve portion 1320 to facilitate rotation of the blade about the blade axes. The blade coupling member 1322 may include or be coupled to an actuation feature 1324 (e.g., a post, pin, bolt, protrusion, etc.), which is positioned in and extends through a slot 1326 defined in the sleeve portion 1320. The actuation feature 1324 is configured to slide within the slot 1326 and engage or contact the ends of the slot 1326 to define the blade angles of the rotor blades, as described herein.

A rotor gear 1304 is positioned around the sleeve portion 1320. The rotor gear 1304 defines a capture feature 1328 (e.g., a hole) that receives or otherwise engages the actuation feature 1324. The interaction between the capture feature 1328, the actuation feature 1324, and the slot 1326 is configured to change the blade angles in response to and/or using the rotational force applied by the drive gear 1306 to the rotor gears 1304. For example, when the drive gear 1306 rotates in a first direction (e.g., as shown in FIG. 13A), the engagement with the rotor gear 1304 causes the rotor gear 1304 to rotate about the sleeve portion 1320 (assuming the actuation feature 1324 is not already fully engaged against the end of the slot 1326). The rotation of the rotor gear 1304 imparts a force on the actuation feature 1324 that rotates the blade coupling member 1322 relative to the sleeve portion 1320, thereby changing the blade angle of the rotor blade. The actuation feature 1324 continues to move within the slot 1326 until it reaches the end of the slot 1326, where it contacts the end of the slot and prevents further rotation of the blade coupling member 1322 and the rotor gear 1304. In this configuration, as shown in FIGS. 13A and 13C, the blade is oriented at the first collective blade angle, and because the rotor gear 1304 is prevented from further rotation about the sleeve portion 1320, further rotations of the drive gear 1306 result in rotation of the rotor hub 1300 about the rotor axis (e.g., providing thrust). Additionally, the force from the drive gear 1306 acting on the rotor gear 1304 during thrust-producing rotations results in a retention or biasing force acting to retain the actuation feature 1324 against the end of the slot 1326 and thus holds the rotor blade at the target collective blade angle.

FIGS. 13B and 13D illustrate the rotor 1301 after having changed its rotation direction, resulting in the rotor blades changing from a first collective blade angle to a second collective blade angle. As shown in FIG. 13B, the motor 1308 is rotating in a second rotational direction 1314, causing the rotor blades 1302 to rotate in the second direction as well (arrow 1303). FIG. 13D illustrates the positions of the rotor gear 1304, blade coupling member 1322, and actuation feature 1324 under these rotational conditions. In particular, the rotation of the motor 1308 in the second direction has caused the rotor gear 1304 to rotate about the blade axis, thereby imparting a force to the actuation feature 1324 to rotate the blade coupling member 1322 about the blade axis and slide the actuation feature 1324 within the slot 1326 until it reaches the opposite end of the slot. Upon reaching and contacting or otherwise engaging the opposite end of the slot 1326, the blade is oriented at the second collective blade angle and further motor rotations result in the rotor hub 1300 rotating about the rotor axis and producing thrust in the second direction.

Figure 14:
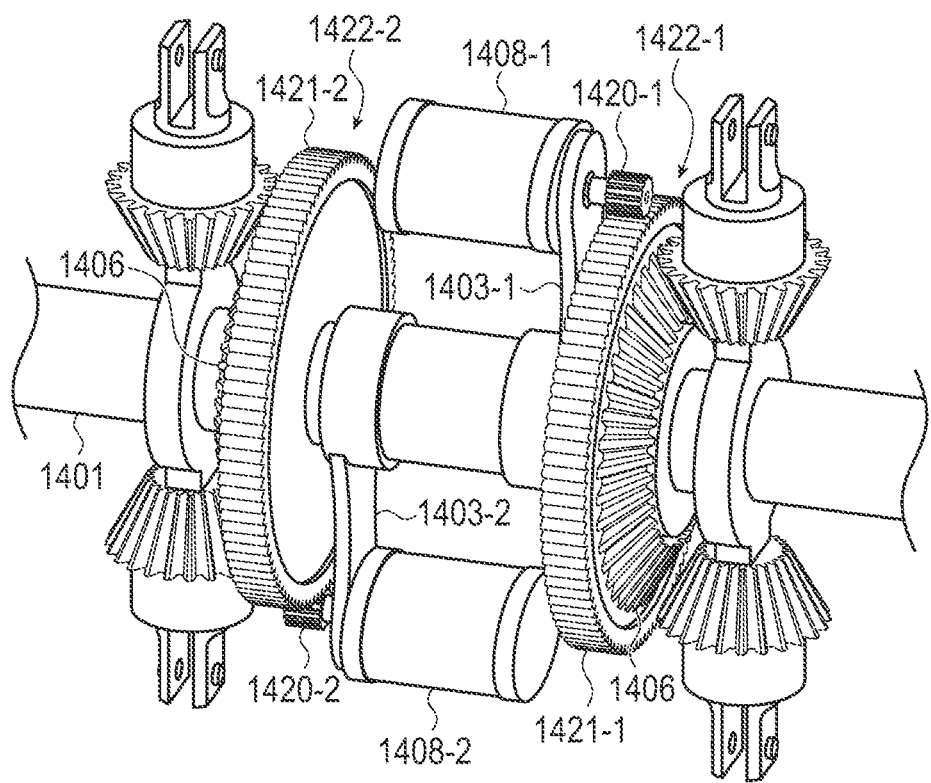
FIG. 14 illustrates another example propulsion system with rotors having variable collective blade angles.

FIGS. 12A-13D illustrate example rotors that use shaft-mounted (also referred to as direct-drive) motors to rotate the drive gears. More particularly, the drive gears in the examples of FIG. 12A-13D are coupled directly to a rotating portion of a motor. This is merely one example implementation, however, and other types of motors may be used to drive the drive gears of the rotors shown in FIGS. 12A-13D. FIG. 14 illustrates an example rotor system that includes two rotors similar to the rotor 1301, but which include drive gears that are driven by a pinion gear on a motor. In particular, the rotors in FIG. 14 include motors 1408, which may be coupled to a mounting shaft 1401 via motor brackets 1403. The motors 1408 are coupled to pinion gears 1420, and the pinion gears engage ring gear portions 1421 of the drive gears 1422. The drive gears 1422 include bevel gear portions 1406 that engage rotor gears in the manner described above.

In the foregoing examples, the first and second collective blade angles are described as being 180 degrees apart, resulting in the rotor blades having effectively the same collective blade angle (but in opposite directions) in both thrust directions. This is merely one example implementation, however, and the collective blade angles for the rotational directions of the rotor may be different from one another. For example, it may be desirable for forward and reverse thrust modes to produce different amounts of thrust values at the same rotor speed. Accordingly, rotors may be designed so that in a forward thrust mode (e.g., for wing-borne flight), the collective blade angle is one value (e.g., 10 degrees), and in a reverse thrust mode (e.g., for rotor-borne flight), the collective blade angle is a different value (e.g., 15 degrees). In this example, collective blade angle values are relative to the direction of thrust, so a 10 degree collective blade angle in the forward thrust direction and a 10 degree collective blade angle in the reverse thrust direction are 180 degrees apart (e.g., corresponding to a 180 degree rotation of the rotor blades about the blade axes). The particular collective blade angle for each thrust direction may be determined based on factors such as a target thrust value, target rotor speed and/or motor speed values, target aircraft speed values, target rotor or motor efficiencies, or the like.

As used herein, the blade angle of a single rotor may be described as being oriented at a collective blade angle. As used herein, the term collective blade angle may refer to the blade angle of a single rotor blade of a multi-blade rotor, in which the blade angles of all of the rotors are substantially the same. It will be understood that the same principles, structures, components, methods of operation, or other aspects described with respect to positioning rotor blades at collective blade angles may apply equally to implementations in which the blade angle is not a collective blade angle (e.g., where individual rotor blades have different and/or variable blade angles).

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above, below, over, under, left, or right (or other similar relative position terms), do not necessarily refer to an absolute position relative to an external reference, but instead refer to the relative position of components within the figure being referred to.

What is claimed is:

1. An aircraft comprising:
a body structure;
a tail section articulatably coupled to the body structure and comprising:
a tail structure;
a propulsion system coupled to the tail structure and configured to produce thrust for the aircraft, including:
in a rotor-borne flight mode, producing the thrust in an aft direction along a longitudinal axis of the body structure; and
in a wing-borne flight mode, producing thrust in a forward direction along the longitudinal axis of the body structure; and
a stabilizer coupled to the tail structure; and
an actuation system configured to articulate the tail section relative to the body structure to change a thrust vector of the propulsion system and an angle of attack of the stabilizer during flight.

2. The aircraft of claim 1, wherein the actuation system is configured to articulate the tail section about at least two perpendicular rotational axes.

3. The aircraft of claim 1, wherein the rotor-borne flight mode corresponds to a vertical take-off operation in which the longitudinal axis of the body structure is substantially perpendicular to a ground reference.

4. The aircraft of claim 2, wherein the propulsion system comprises:
a first rotor configured to rotate in a first rotational direction; and
a second rotor configured to rotate in a second rotational direction opposite the first rotational direction.

5. The aircraft of claim 4, wherein the aircraft is configured to control a roll of the aircraft by changing a relative speed between the first rotor and the second rotor.

6. An aircraft comprising:
a fuselage;
a pair of wings extending from the fuselage and configured to produce lift in a wing-borne flight mode of the aircraft;
a tail section coupled to the fuselage and comprising:
a propulsion system configured to produce thrust for the aircraft, including:
in a rotor-borne flight mode, producing the thrust in an aft direction along a longitudinal axis of the fuselage; and
in a wing-borne flight mode, producing thrust in a forward direction along the longitudinal axis of the fuselage; and
a stabilizer; and
a gimballing mechanism coupling the tail section to the fuselage and configured to rotate the tail section, relative to the fuselage, about at least two rotational axes.

7. The aircraft of claim 6, wherein the at least two rotational axes include:
a first axis of rotation; and
a second axis of rotation perpendicular to the first axis of rotation.

8. The aircraft of claim 7, wherein:
rotation of the tail section about the first axis of rotation during wing-borne flight changes a pitch of the aircraft; and
rotation of the tail section about the second axis of rotation during wing-borne flight changes a yaw of the aircraft.

9. The aircraft of claim 6, wherein the gimballing mechanism is configured to change a vector of the thrust during the rotor-borne flight mode of the aircraft to control at least one of an attitude of the aircraft or a direction of flight of the aircraft.

10. The aircraft of claim 9, wherein the rotor-borne flight mode corresponds to at least one of a vertical take-off operation or a vertical landing operation.

11. The aircraft of claim 6, wherein the gimballing mechanism is configured to change an angle of attack of the stabilizer during the wing-borne flight mode to control at least one of an attitude of the aircraft or a direction of flight of the aircraft.

12. The aircraft of claim 11, wherein:
the stabilizer is a first stabilizer; and
the tail section further comprises at least one second stabilizer.

13. An aircraft configured for vertical take-off and vertical landing operations, comprising:
a fuselage;
a pair of wings extending from the fuselage; and
a tail section articulatably coupled to the fuselage and comprising:
a propulsion system configured to produce thrust for the aircraft; and
a stabilizer, wherein the aircraft is configured to:
articulate the tail section relative to the fuselage during a vertical take-off operation to change a vector of the thrust produced by the propulsion system, thereby changing at least one of an attitude or a direction of flight of the aircraft; and
articulate the tail section relative to the fuselage during a wing-borne flight mode of the aircraft to change an angle of attack of the stabilizer; and
the propulsion system is configured to:
produce thrust in a first direction during the vertical take-off operation; and
produce thrust in a second direction during the wing-borne flight mode, the second direction substantially opposite the first direction.

14. The aircraft of claim 13, wherein a longitudinal axis of the fuselage is substantially perpendicular to a ground reference during the vertical take-off operation and substantially parallel to the ground reference during the wing-borne flight mode.

15. A method of controlling an aircraft in multiple modes of flight, comprising:
at an aircraft comprising:
a body structure;
a pair of wings extending from the body structure; and
a tail section comprising a propulsion system and a set of stabilizers:
during a rotor-borne flight mode:
producing thrust, with the propulsion system, in an aft direction along a longitudinal axis of the body structure; and
controlling movement of the aircraft about a pitch axis and a yaw axis by articulating the tail section relative to the body structure; and
during a wing-borne flight mode:
producing thrust in a forward direction along the longitudinal axis of the body structure; and
controlling movement of the aircraft about the pitch axis and the yaw axis by articulating the tail section relative to the body structure.

16. The method of claim 15, wherein the aircraft further comprises:
a closed-loop pitch controller configured to control a pitch of the aircraft using a first set of tuning parameters during the rotor-borne flight mode and using a second set of tuning parameters during the wing-borne flight mode; and
a closed-loop yaw controller configured to control a yaw of the aircraft using a third set of tuning parameters during the rotor-borne flight mode and using a fourth set of tuning parameters during the wing-borne flight mode.

17. The method of claim 15, wherein the rotor-borne flight mode corresponds to a vertical take-off operation in which the longitudinal axis of the body structure is substantially perpendicular to a ground reference.

18. The aircraft of claim 1, wherein the actuation system is configured to change a vector of the thrust during the rotor-borne flight mode of the aircraft to control at least one of an attitude of the aircraft or a direction of flight of the aircraft.

19. The aircraft of claim 18, wherein the actuation system is configured to change an angle of attack of the stabilizer during the wing-borne flight mode to control at least one of an attitude of the aircraft or a direction of flight of the aircraft.

20. The aircraft of claim 1, wherein the rotor-borne flight mode corresponds to a vertical landing operation in which the longitudinal axis of the body structure is substantially perpendicular to a ground reference.

21. The aircraft of claim 13, wherein the propulsion system is further configured to produce thrust in the first direction during a vertical landing operation.

* * * * *